United States Patent [19]
Yamaguchi

[11] Patent Number: 5,765,067
[45] Date of Patent: Jun. 9, 1998

[54] FILM REWINDER

[75] Inventor: Takuji Yamaguchi, Wakayama, Japan

[73] Assignee: Noritsu Koki Co., Ltd., Wakayama, Japan

[21] Appl. No.: 731,980

[22] Filed: Oct. 23, 1996

[30] Foreign Application Priority Data

Oct. 23, 1995 [JP] Japan .................................. 7-274141
Oct. 24, 1995 [JP] Japan .................................. 7-275534
Oct. 24, 1995 [JP] Japan .................................. 7-275602

[51] Int. Cl.$^6$ .................................................. G03B 1/18
[52] U.S. Cl. .................................................. 396/413; 396/570
[58] Field of Search .................................. 396/387, 411, 396/413, 418, 564, 570

[56] References Cited

U.S. PATENT DOCUMENTS 5,450,153  9/1995  Matsumoto .............................. 396/570
5,471,274  11/1995  Yamaguchi .............................. 396/570

*Primary Examiner*—David M. Gray
*Assistant Examiner*—J. K. Han
*Attorney, Agent, or Firm*—Wenderoth, Lind & Ponack, L.L.P.

[57] ABSTRACT

A film rewinder for rewinding film from a film cartridge to an intermediate cartridge. Its driving unit for rotating the film cartridge spool is also used to drive a tool for separating the film trailing end from the film cartridge spool. The film cartridge has a tool guide, so that the entire device is sufficiently compact. The film rewinder has a film cartridge receptacle and a winding unit for winding the film fed from the film cartridge into the intermediate cartridge. A film guide is provided between the receptacle and the winding unit. The spools of the two cartridges are driven by separate motors independently of each other. The tool is an arcuate member adapted to be pivoted in a circular path by the motor for the film cartridge. In order to minimize the length of the film guide and thus to minimize the size of the entire film rewinder, the film guide is provided with a release guide.

13 Claims, 25 Drawing Sheets

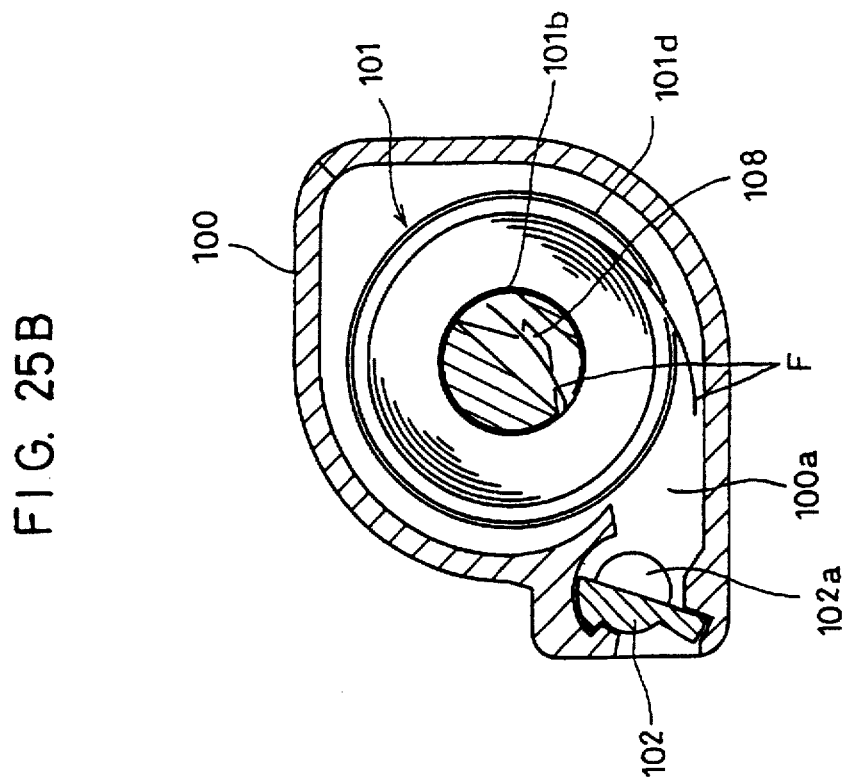
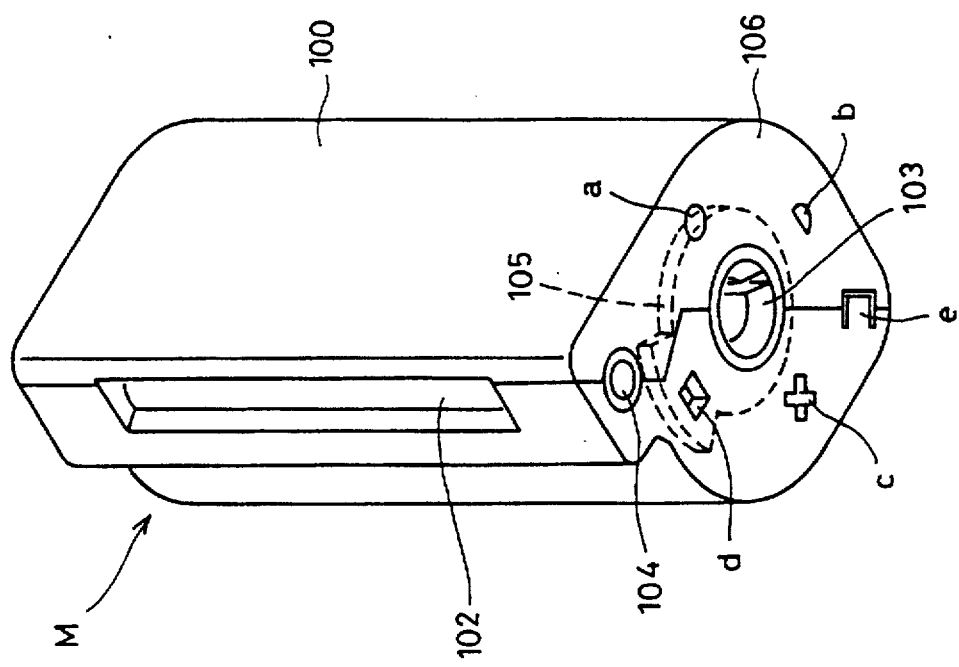
FIG. 25A
FIG. 25B

FILM REWINDER

BACKGROUND OF THE INVENTION

This invention relates to a compact film rewinder for automatically and efficiently rewinding a film stored in a new type of film cartridge to an intermediate cartridge.

Ordinarily, a film is stored in a snail-shaped cartridge called "patrone" with the leading end of the film slightly protruding from the cartridge. Use of such conventional patrones involve various problems. Recently, a new type of cartridge was developed which are free of such problems. Such new type of film cartridge is disclosed in U.S. Pat. Nos. 5,347,334 and 5,031,852.

This film cartridge has a snail-shaped configuration like patrones but is smaller than patrones. It comprises two splittable parts so that the film wound around its spool can be taken out if necessary. It can store not only an unexposed film but also a developed and printed negative film.

An unexposed film is stored entirely in the cartridge prior to use. The film outlet is completely closed by a lid. When the cartridge is set in a camera, the film is fed out of the cartridge through its outlet by rotating the spool with the film outlet lid open.

The film trailing end is secured to the spool by engaging ribs protruding from a slit formed in the spool in holes formed in the trailing end of the film. The spool has flanges provided with edge members as film feed guides. Disposed between one of the spool flanges and the inner surface of the case is an arcuate disk plate carrying marks that indicate that the film is unexposed, exposed or developed, or bar codes for preventing double exposure.

FIGS. 25 and 26 show this new type of film cartridge M. It is disclosed in the above-mentioned U.S. Patents. The structure of this film cartridge will be fully understood by referring to these patent documents.

As shown in FIG. 25, the film cartridge M contains a film take-up spool 101 in a snail-shaped cartridge case 100. Unlike patrones, the case 100 comprises two separable halves as shown. A door 102 is provided at a film outlet defined between the two halves when they are closed. Rotary shafts are connected to the spool 101 and the door 102 at one end of the cartridge. The respective rotary shafts are rotated by drive shafts that are inserted in holes 103 and 104.

At the end of the cartridge where there are the rotary shafts, an indicator plate 105 having a sector portion is provided. Differently shaped holes a–d are formed in an end plate 106 of the case. The holes a to d indicate that the film is unexposed (not photographed), partially exposed, exposed (but not developed yet), and developed, respectively. By rotating the indicator plate 105, its sector portion, colored white, can be brought into alignment with one of the holes a–d, so that the hole brought into alignment with the sector portion turns white. Thus, one can see the state of the film by checking which hole is colored white.

As seen in FIG. 25B, the film F around a spool shaft 101b of the spool 101 is entirely wound into the cartridge case 100 and completely shielded from light by closing the film outlet with the door 102. To expose the film, i.e. to take pictures, the door 102 is opened and the spool 101 is rotated to push the film F out of the cartridge.

To wind film F on the spool 101, as shown in FIG. 16B, the trailing end of the film F is inserted in a slit 107 formed in the spool shaft 101b until a rib 108 engage in a hole h formed in the film F near its trailing end. Then, the spool 101 is rotated. When the film is entirely wound around the spool 101, a cutout 109 formed near the leading end of the film F is caught by a skirt of the flange 101c and the film stops.

In order to develop and print a film stored in this type of film cartridge, the trailing end of the film has to be separated from the spool before feeding it into a developing or a printing machine. But it is impossible to automatically separate the film from the spool. Thus, in order to effectively develop a film stored in such film cartridge, the film has to be rewound onto e.g. an intermediate cartridge.

A film winding device for winding a film into such an intermediate cartridge or a similar film take-up unit is disclosed in Unexamined Japanese Patent Publication 5-232633. This winding device has a film cartridge receptacle, and a film take-up unit spaced a predetermined distance from the receptacle. Film feed rollers and a film guide are provided therebetween and separate motors are provided for the film cartridge and the feed rollers.

The film is fed by rotating the spool in the film cartridge with a film cartridge motor until the film leading end is caught by the feed rollers. Thereafter, the film is fed to the take-up unit by rotating the feed rollers with the feed roller motor. When the film trailing end gets clear of the cartridge and the feed rollers, the respective motors stop. But due to the inertia of a flywheel provided between the spool and the film cartridge motor, the spool tends to keep rotating for a short while after the motors have stopped.

Due to this extra rotation of the spool, the rib will disengage from the hole in the film near its trailing end. In this state, the feed roller motor is reactivated to feed the film until its trailing end separates from the feed rollers. The film is thus separated from the spool in the film cartridge.

A similar device is disclosed in Unexamined Japanese Patent Publication 6-130633. The separator of "an engaging device and a separator for photographic film" disclosed in this publication has a release plate adapted to be inserted into the film cartridge through a film outlet formed in the cartridge case to disengage the trailing end of the film from a rib in a slit of a spool shaft.

This new type of film cartridge is designed to automatically feed film. A film is stored entirely in the cartridge, irrespective of whether the film is an exposed one or an unexposed one, unlike patrones in which films are stored with its leading end slightly protruding from the case. The leading end of the film is fed by rotating the spool.

The film stored in this new type of film cartridge is ordinarily rewound automatically to an intermediate cartridge using two separate motors, one for rotating the film cartridge spool to feed the film out of the film cartridge and the other for rotating the intermediate cartridge spool to wind the film into the intermediate cartridge. When the film is nearly completely fed out of the film cartridge, a tool for separating the film trailing end from a film engaging rib protruding from the film cartridge spool is inserted into the film cartridge to disengage the film trailing end from the spool.

The tool may be driven by a third driving unit other than the driving units for driving the film cartridge spool and the intermediate cartridge spool, or by the driving unit for the film cartridge spool.

The latter, i.e. using the driving unit for the film cartridge spool is preferable because the tool is driven or moved when the film is nearly completely fed out of the film cartridge.

Also, for compactness of the entire film rewinder, it is preferable to move the tool along a circular path. In this case, the tool has to be moved in the direction opposite to the direction in which the film is fed out of the film cartridge.

If the driving unit for driving the film cartridge spool is used to move the tool, the tool may damage the film because it starts moving when the film is nearly completely fed out of the cartridge spool.

An object of this invention is to provide a film rewinder for rewinding film from the above-described new type of film cartridge to an intermediate cartridge which has an arcuate tool for separating the film trailing end from the film cartridge by moving the tool along a circular path in the direction opposite to the direction in which the film is fed out of the film cartridge, which includes a rotation transmission mechanism for transmitting torque to the tool, and which is small, compact and efficient in operation due to a minimum distance between the two cartridges.

The intermediate cartridge has a door similar to the door of the film cartridge at the film inlet so that film can be easily inserted. In order that the film wound in the intermediate cartridge can be easily pulled out of it, the film is simply wound around the spool of the intermediate cartridge without binding or fixing its leading end to the spool and with its trailing end slightly protruding from the cartridge.

It is therefore necessary that the film rewinder for rewinding the film in the film cartridge to the intermediate cartridge have means for winding film around the intermediate cartridge spool in the above-described manner. Also, such a rewinder has to be sufficiently small, and easy, efficient and reliable to operate.

The film rewinder which can fulfill all of the above requirements should preferably have the following functions:

(1) of opening and closing the cover plate of the processing device, and the doors of the film cartridge and the intermediate cartridge; and (2) makes it possible to easily set the film cartridge and the intermediate cartridge in the processing device and to pull them easily out of the film guide even while the film is being rewound.

Moreover, in order to automate the processing device and also to reduce its size, such a film rewinder has to have a simplified film feed preparation mechanism for setting the film cartridge and the intermediate cartridge in the processing device so that the film can be fed from the film cartridge to the intermediate cartridge.

Any of the conventional film rewinders cannot, or is not even intended to, reduce the size of the processing device or improve its operability. A film rewinder which can solve all the abovementioned problems have therefore been desired.

Another object of this invention is to provide a film rewinder which makes it possible to efficiently set the film cartridge and the intermediate cartridge in the film processing device and to reduce its size.

SUMMARY OF THE INVENTION

According to this invention, there is provided a film rewinder for rewinding from a film cartridge to an intermediate cartridge, the film cartridge and the intermediate cartridge each having a spool, the film rewinder comprising a case having an openable cover plate, a receptacle for receiving the film cartridge and a film winding unit for winding film into the intermediate cartridge, the film cartridge receptacle and the film winding unit being provided opposite to and spaced from each other in the case, a film guide for guiding film being fed from the film cartridge to the film winding unit, driving units for rotating the spools of the film cartridge and the intermediate cartridge independently of each other, an arcuate tool for separating the trailing end of film from the spool of the film cartridge after the film has been wound into the intermediate cartridge, an arm for pivoting and inserting the tool into the film cartridge by rotating in the direction opposite to the direction in which the spool of the film cartridge is rotated, and a rotation transmission means for transmitting the rotation of the driving unit for rotating the spool of the film cartridge to the arm to pivot the arm, the film guide having an arcuate tool guide for guiding the tool, the length of the film guide including the tool guide being set to a minimum value so that the distance between the film cartridge receptacle and the film winding unit will be minimum.

With a film cartridge and an intermediate cartridge set in the film rewinder according to this invention, the film stored in the film cartridge is rewound into the intermediate cartridge by driving the driving units for the respective cartridges. Initially, by rotating the film cartridge spool, the leading end of the film comes out of the film cartridge. When the film leading end is inserted into the intermediate cartridge, its spool is rotated by its driving unit, so that the film is wound therearound.

The film is wound around the intermediate cartridge with its leading end lightly pressed by a presser member so that the film end can be separated from the spool easily when unrolled from the intermediate cartridge to be fed into e.g. a developing machine.

When the film has been nearly completely wound into the intermediate cartridge and the end mark, provided on the film at a predetermined distance from its trailing end, is detected by a sensor, the driving unit for the film cartridge begins rotating in the reverse direction. The reverse rotation of the driving unit is transmitted through the rotation transmission mechanism to the tool, thus moving the tool in a circular path in the direction opposite to the direction in which the film is fed out of the film cartridge.

The tool is thus guided through the tool guide and inserted into the film guide through its opening. The film trailing end is thus disengaged from the engaging piece on the spool by the tip of the tool. Once separated from the spool, the film is completely wound into the intermediate cartridge by the force of the driving unit for the intermediate cartridge.

While the driving unit for the film cartridge is rotating in the reverse direction, its rotation is transmitted to the tool through the rotation transmission mechanism to pivot the tool back and forth. That is, the tool is moved into the film cartridge to separate the film from the spool and then moved back to its original position. When the tool pivots back to its original position, the driving unit for the film cartridge is deactivated.

The tool is an arcuate member and is adapted to pivot in a circular path so that it takes up as little space as possible. Further, by forming the tool guide integrally in the film guide, it is also possible to minimize the length of the film guide. There is no need to provide feed rollers in such a film guide. This makes it possible to minimize the size of the entire device.

When the driving unit for feeding the film from the film cartridge is used to drive the tool, a one-way rotation transmission means is provided on a rotary shaft for driving the film cartridge spool to transmit the rotation of the driving unit to the spool only while it is rotating in the normal direction to feed the film from the cartridge. While the driving unit is rotating in the reverse direction, its rotation is not transmitted to the film cartridge spool. Instead, its rotation is transmitted to the tool.

Thus, even while the driving unit is rotating in the reverse direction to drive the tool, the rotary shaft of the film cartridge spool keeps rotating in the normal direction to feed film completely out of the film cartridge.

It is preferable to provide a nail bending means for bending a nail provided on the end plate of the film cartridge while the tool is rotating.

The nail bending means is activated to bend the nail if the nail should not be bent in spite of the fact that the film in the film cartridge has been developed. Thus, it prevents any trouble thereafter.

Preferably, the tool is detachably coupled to the free end of the arm for rotating the tool by an engaging piece, the position of which is adjustable by a resilient member so that the tool can be replaced easily.

In this arrangement, the tool can be replaced easily if it is worn or otherwise damaged after long use.

There is also provided a film rewinder for rewinding from a film cartridge to an intermediate cartridge, the film cartridge and the intermediate cartridge each having a spool, the film rewinder comprising a case having an openable cover plate, a receptacle for receiving the film cartridge and a film winding unit for winding film into the intermediate cartridge, the film cartridge receptacle and the film winding unit being provided opposite to and spaced from each other in the case, a film guide for guiding film being fed from the film cartridge to the film winding unit, driving units for rotating the spools of the film cartridge and the intermediate cartridge, a tool for separating a film trailing end from the spool of the film cartridge when the film is wound into the intermediate cartridge, the cover plate carrying a slidable knob plate having a knob, the film guide comprising two members, at least one of the two members being opened when one of the cover plate and the knob plate is moved, and means for transmitting the movement of the one of the cover plate and the knob plate to doors of both of the film cartridge and the intermediate cartridge to open and close the doors, wherein initial settings for both of the cartridges are operatively linked together.

In order to feed a film from a film cartridge and rewind into an intermediate cartridge, it is necessary to set the film cartridge and the intermediate cartridge and most importantly, to stably hold the intermediate cartridge in position.

According to the present invention, such preparations for film rewinding are carried out making use of the movement of the knob plate provided on the cover plate. More specifically, the film rewinder according to this invention has a mechanism for opening and closing the film guide when the cover plate is closed, for opening and closing the doors of the respective cartridges, and for stably holding the intermediate cartridge in position with a protrusion provided on the backside of the cover plate.

With this arrangement, simply by setting both cartridges, closing the cover plate, and locking it with the knob plate, the film guide is closed, the doors of both cartridges are closed, and the intermediate cartridge is held stably in position. This arrangement also makes it possible to reduce the size of the entire device.

Other features and objects of the present invention will become apparent from the following description made with reference to the accompanying drawings, in which:

BRIEF DESCRIPTION OF THE DRAWINGS

FIG. 25A is a perspective view of a film cartridge;

FIG. 25B is its sectional view;

DETAILED DESCRIPTION OF THE PREFERRED EMBODIMENT

Embodiments of this invention will now be described with reference to the drawings.

Figure 1:
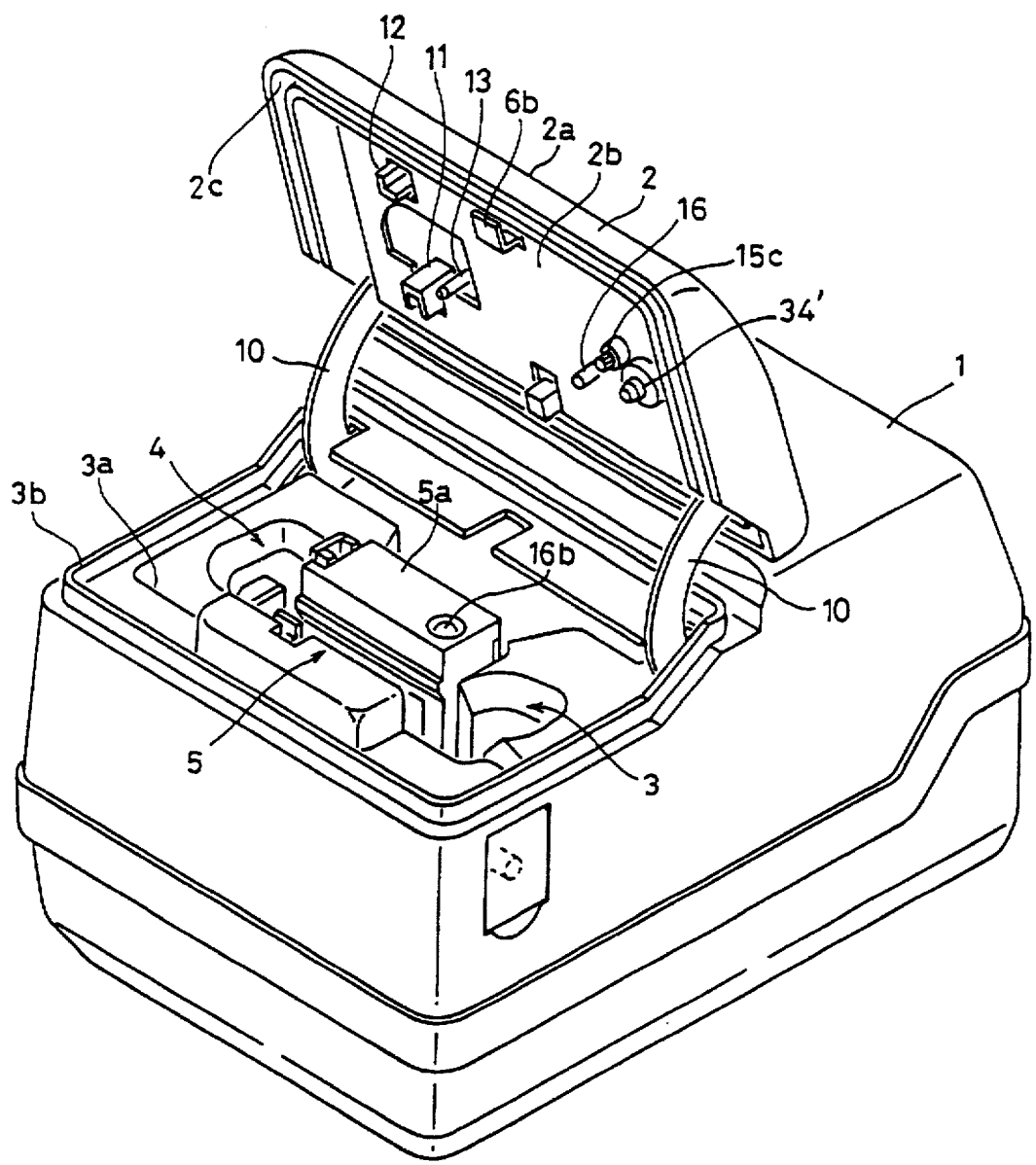
FIG. 1 is a perspective view of a film rewinder of an embodiment.
Figure 2:
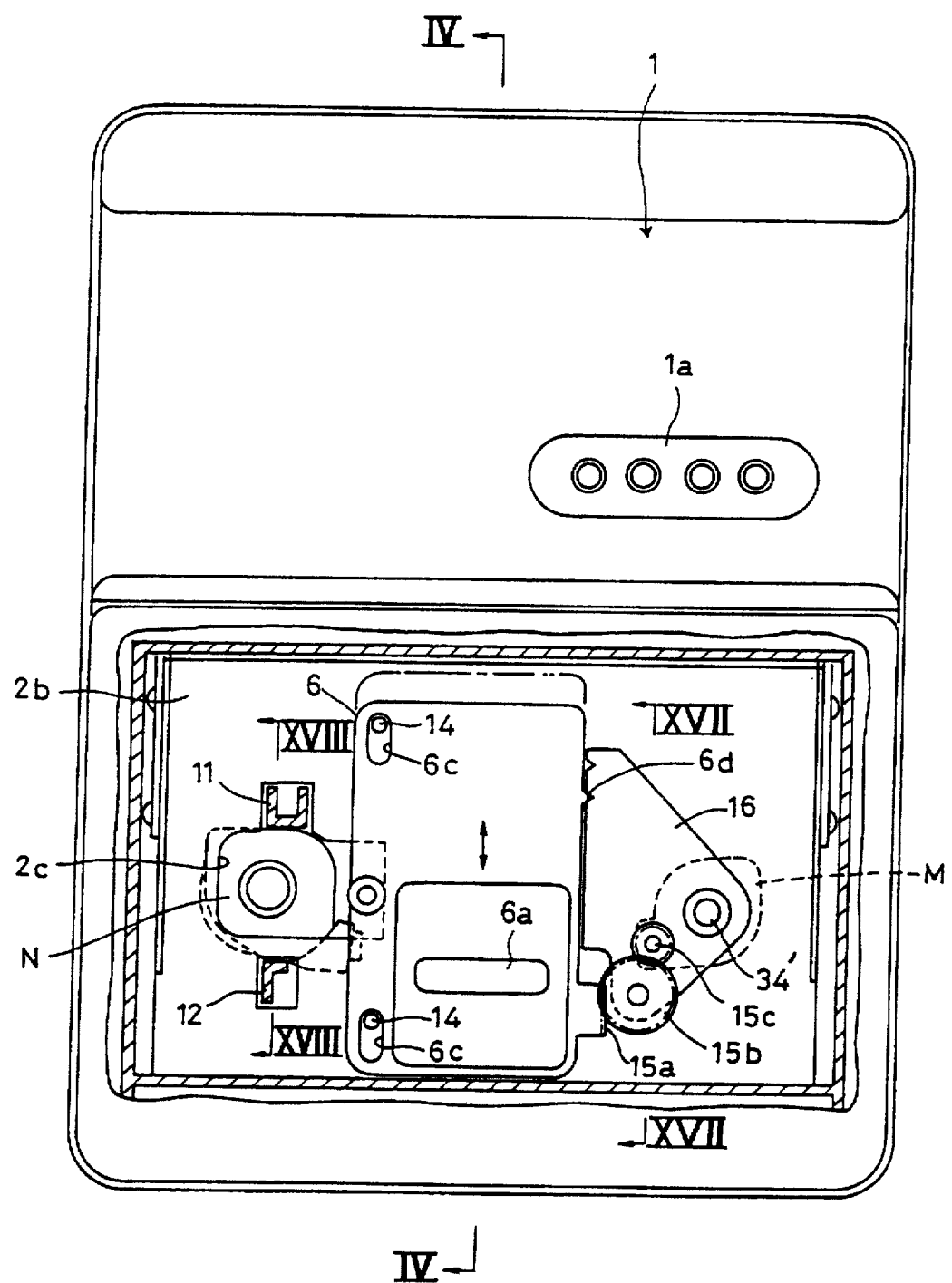
FIG. 2 is a plan view of the same with the cover plate open.
Figure 3:
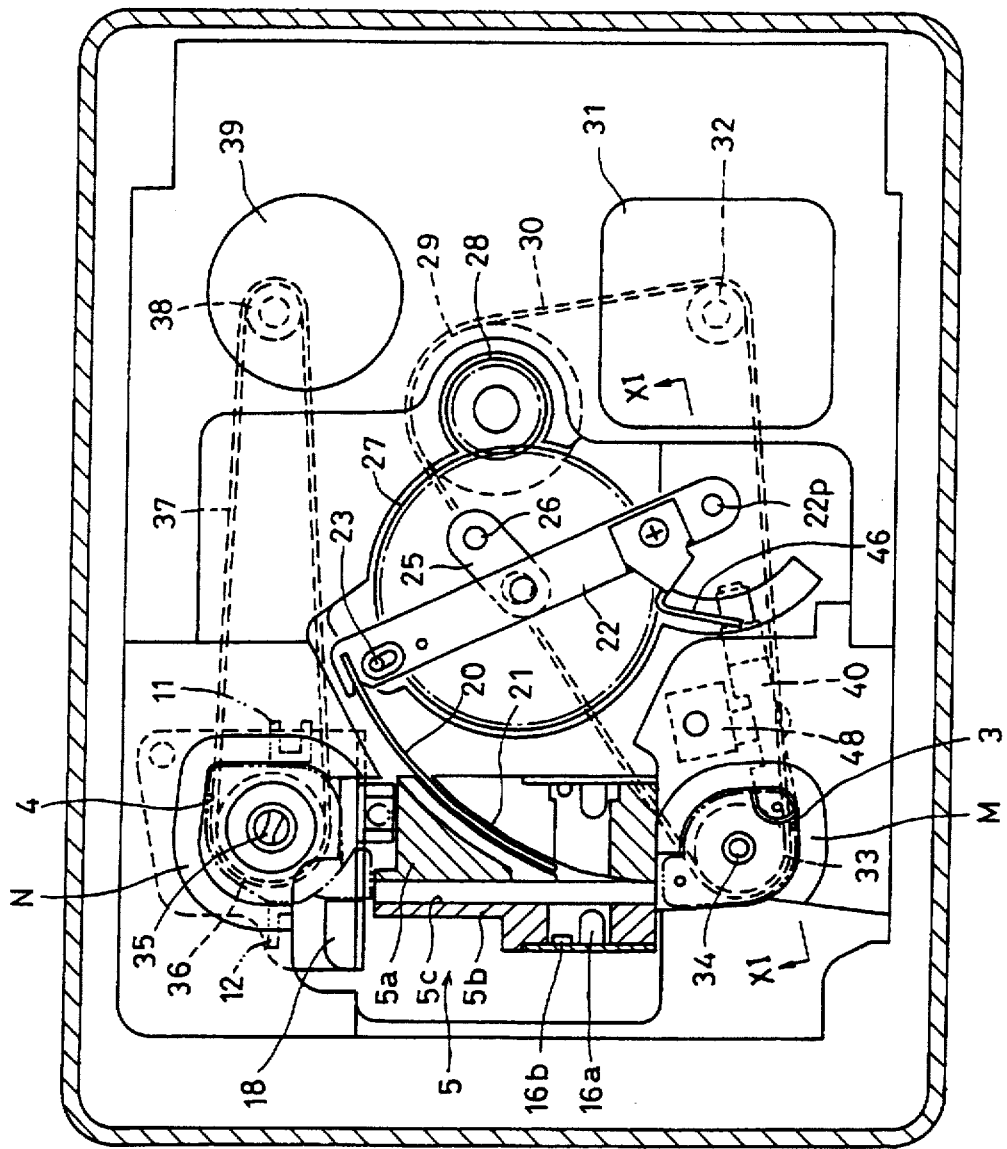
FIG. 3 is a plan view of the same showing its inner structure.

FIG. 1 is a perspective view of the film rewinder, FIG. 2 is a plan view partially sectioned by removing the cover plate, and FIG. 3 is a sectional plan view showing mechanical parts on an intermediate bottom plate. As shown in FIG. 1, a cover plate 2 is provided to cover the front top of the case 1. By opening the cover plate 2, one can see a film cartridge receptacle 3 and a winding unit 4 spaced a predetermined distance from the receptacle 3 for rewinding film to the intermediate cartridge. A film guide 5 is provided therebetween.

Figure 4:
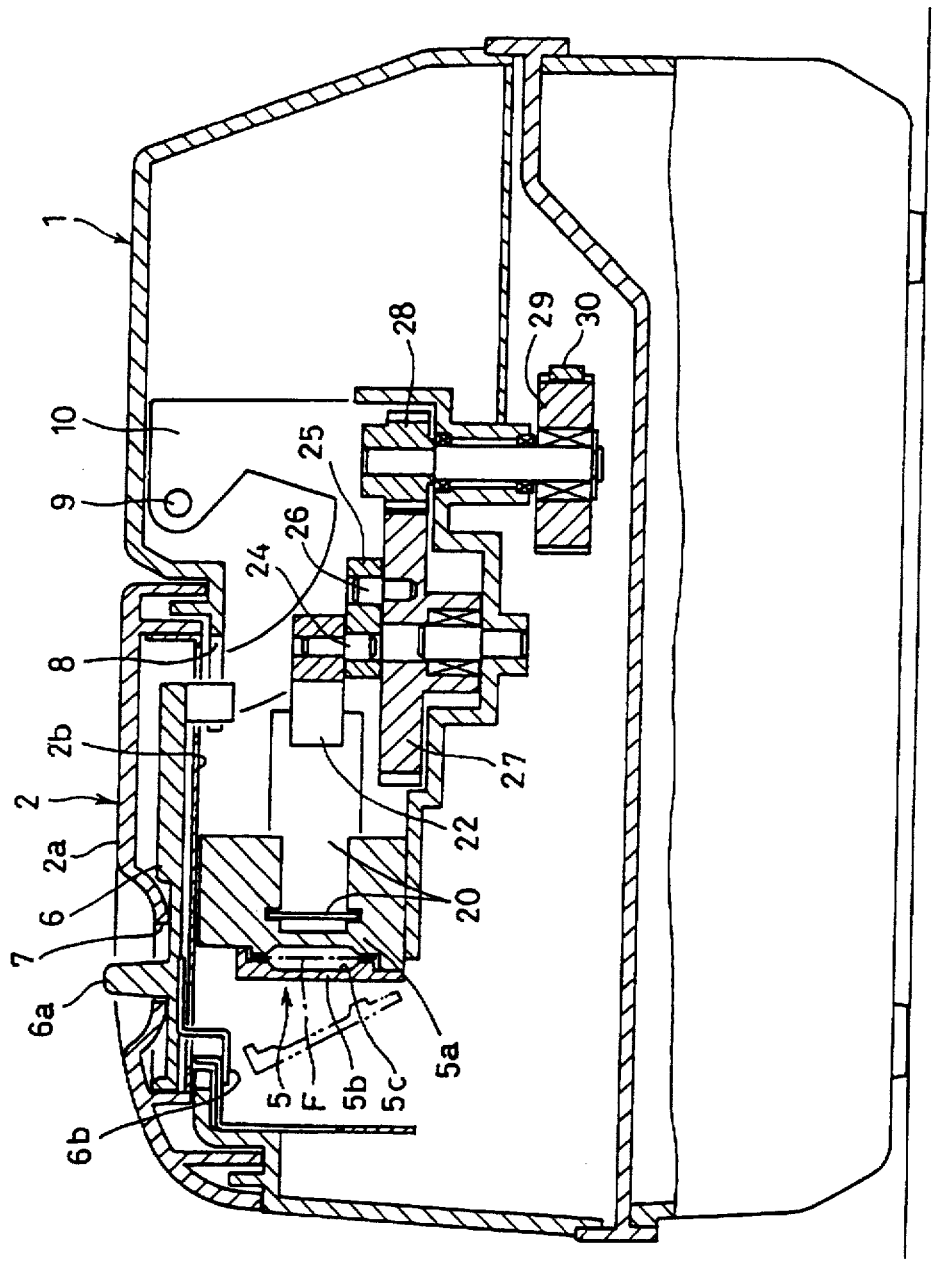
FIG. 4 is a sectional view taken along line IV—IV of FIG. 2.

As shown in FIG. 4, the cover plate 2 has a double-wall structure, comprising front wall 2a and a back wall 2b. A knob plate 6 having a knob 6a is provided between the walls 2a and 2b. It is movable by a distance equal to the width of the opening 7 shown. The knob plate 6 has an engaging piece 6b on its back. By pulling the knob 6a to the position shown in FIG. 4, the engaging piece 6b engages the case 1, thus locking the cover plate 2 in the closed position in which it closes an opening 8 of the case 1. The cover plate 2 is pivoted about a pin 9 (FIG. 4) by arms 10 (FIG. 1).

Engaging pieces 11 and 12 are provided on the back of the cover plate 2 (FIG. 1). They extend through an opening 2c formed in the back wall 2b of the cover plate 2 to support a shoulder of the intermediate cartridge N in the manner to be described below. A pin 13 provided on the back of the knob plate 6 also extends through the back wall 2b. The pin 13 is used to open and close a film inlet door of the intermediate cartridge N.

Figure 5:
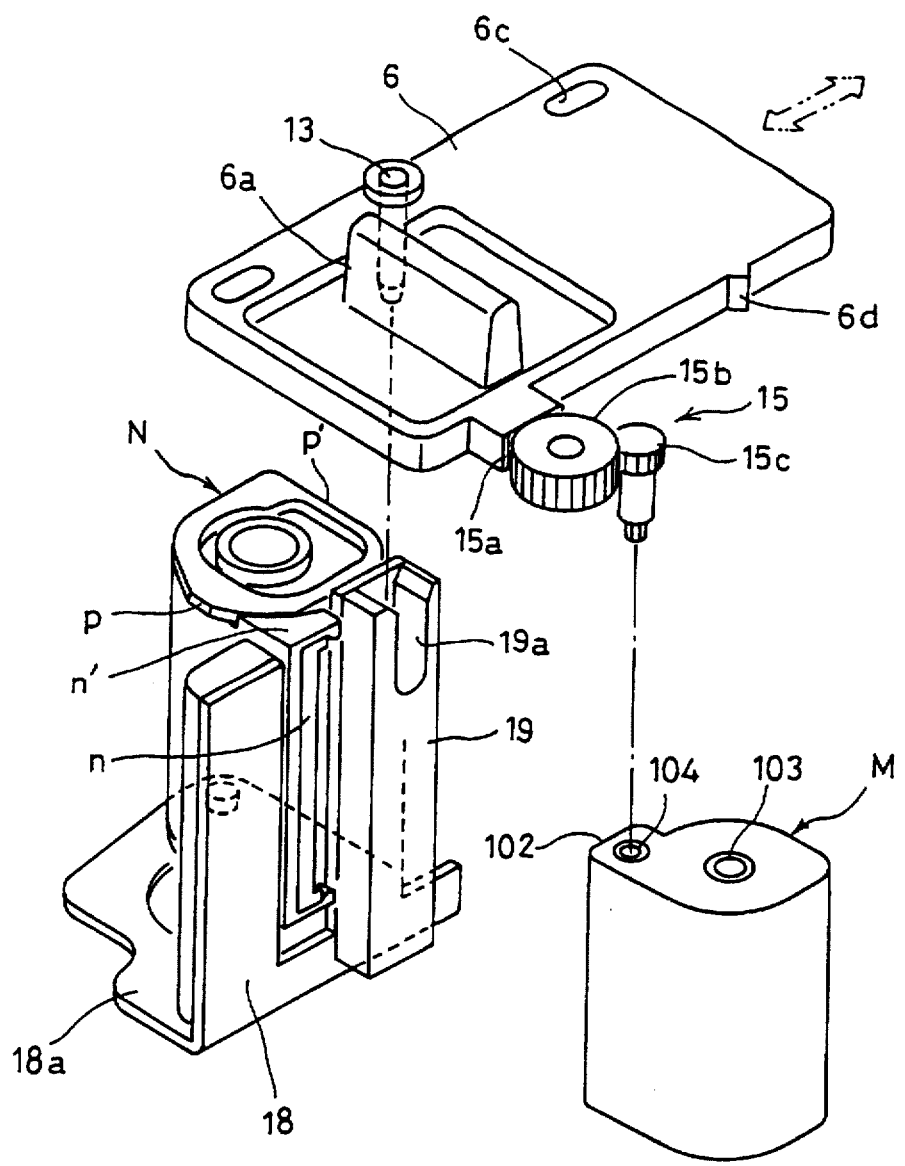
FIG. 5 is a perspective view of a mechanism for opening and closing the cartridge door by moving the knob plate.

The knob plate 6 is formed with two elongated holes 6c in which are received pins 14 (FIG. 2) so that the knob plate 6 is slidable back and forth between the positions shown by solid line and two-dot chain line. On the righthand side of the knob plate 6 is a gear train for opening and closing the film feed door of the film cartridge M (FIG. 5). It comprises a rack 15a, a pinion 15b and a small gear 15c.

The cover plate 2 carries on its back wall 2b a substantially triangular fixing plate 16 having a plurality of triangular grooves (FIG. 2). The knob plate 6 has a protrusion 6d on its right side. By engaging the protrusion in one of the triangular grooves of the fixing plate 16, the knob plate 6 can be fixed in one of a plurality of positions. In FIG. 2, numeral 1a designates indicator lamps.

As shown in FIG. 3, the distance between the axes of the film cartridge M and the intermediate cartridge N should be as short as possible (about 90 mm), i.e. the film guide 5 provided therebetween should be as short as possible for the reasons to be described below. As shown, the film guide 5 carries no feed rollers.

The film guide 5 comprises a stationary guide member 5a and a rotary guide member 5b (FIG. 3). The pressure from the cover plate 2 when it is closed is transmitted to the rotary guide member 5b by an unillustrated mechanism. With the cover plate closed, the film is fed into the space 5c between the two members 5a, 5b. While being fed through the space 5c, the film is guided by the two guide members. Numeral 17 designates an infrared sensor and 17b does an LED type film sensor.

The cover plate of the intermediate cartridge N is opened and closed by a pillar 18 shown in FIG. 5. The pillar 18 is formed by bending a plate member having two forks into the shape of the letter L. The above-mentioned pin 13 is received in a deep groove 19a formed in the top end of one of the upright forks 19.

The intermediate cartridge N has its bottom supported not on the bent bottom 18a of the pillar 18 but on an unillustrated support member provided on the bottom of the cartridge receptacle. The cover plates n and n' provided at the film inlet of the intermediate cartridge N are sandwiched between the pillar 18 and another pillar member 19. As the pin 13 is pushed down by pressing the knob 6a, the cover n' is pushed open, so that the film F can be inserted into the cartridge N. The case of the cartridge M is supported at points p and p'.

As shown, the small gear 15C of the gear train 15 has its output shaft in engagement with a rotary saft for opening the cover plate of the film cartridge M. By moving the knob 6a, the rotary shaft is rotated, so the cover plate is opened and closed.

As shown in FIG. 3, the film guide 5 is provided with a release guide 21 into which a tool 20 is inserted to cut off the trailing end of the film from the spool in the film cartridge M. The release guide 21 is arcuately shaped and extends from the point near the end of the film guide 5 remote from the film cartridge M to the film cartridge M. The tip of the tool 20 is moved through the release guide 21 and inserted, substantially tangential to the film inlet end of the film guide 5, into the film cartridge M to separate the film trailing end from the spool.

The radius of a release arm 22 is determined so that the tip of the tool 20 comes into contact with the back of the film when it is inserted into the film cartridge M, that it is inserted into the film cartridge M in the direction tangential to the direction in which the film extends from the film outlet of the film cartridge M to the point from which the film is unrolled from the film roll wound around the spool, and that the radius of arc of the release guide 21 is minimum. The release arm 22 pivots about point 22p.

The tool 20 is coupled to the release arm 22 by means of a pin 23 and an unillustrated spring mechanism so as to be easily detachable for repair or replacement.

The release arm 22 is pivotable about the point 22p within a predetermined angular range. The release arm 22 is in engagement near its center pin 24 with an eccentric arm 25 pivotally coupled to a gear 27 by means of a pin 26.

The gear 27 is in mesh with another gear 28, which has a coaxial pulley 29 around which is wound a belt 30 driven by a motor 31 through an output pulley 32. The belt 30 also extends around a pulley 33 coaxially coupled to a rotary shaft 34 for rotating the spool of the film cartridge M. By rotating the spool, the film F in the film cartridge M is fed.

The winding unit 4 for the intermediate cartridge N for rewinding the film fed from the film cartridge M to the intermediate cartridge N has a rotary shaft 35 for rotating the spool of the intermediate cartridge N. A belt 37 is wound around a pulley 36 coaxially coupled to the rotary shaft 35. The belt 37 is driven by a motor 39 through an output pulley 38.

Figure 6:
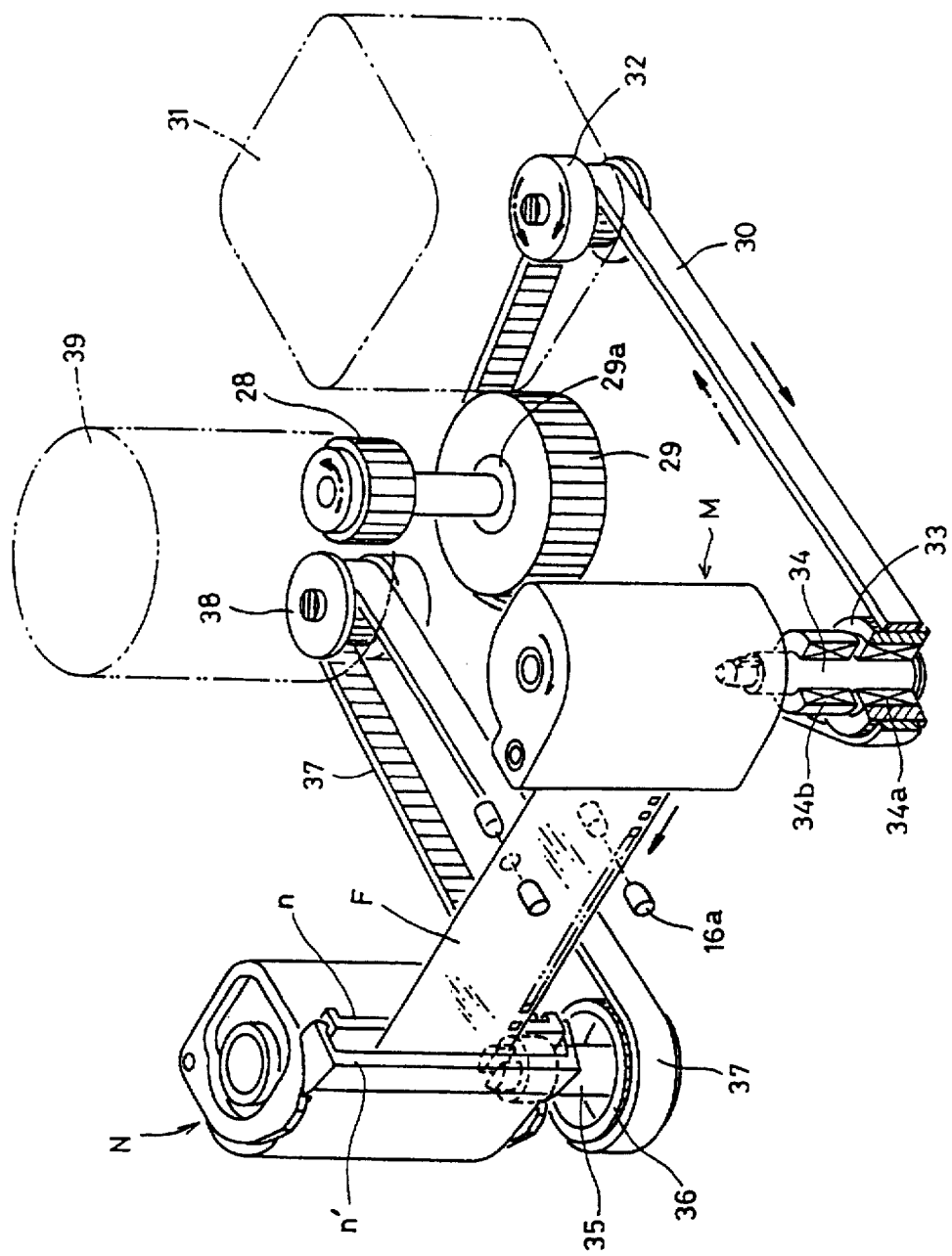
FIG. 6 is a schematic perspective view of the entire driving unit.

FIG. 6 is a perspective view showing the above-described driving mechanism in detail. This figure will enhance understanding of the driving mechanism of the film rewinder.

Description is now made of the operation of the film rewinder according to the present invention.

The film cartridge M and the intermediate cartridge N are set in the receptacle 3 and the winding unit 4, respectively, with the cover plate 2 open. Then, the cover plate 2 is closed and the knob 6a is pulled until the engaging piece 6b engages the case to lock the cover plate 2.

By closing the cover plate 2, the guide member 5b of the film guide 5 is closed as shown in FIG. 4 (normal position). Also, by closing the cover plate 2, the intermediate cartridge N is stably held by the engaging pieces 11 and 12 on the back of the cover plate. Further, by moving the knob plate 6, the doors c and n of the film cartridge M and the intermediate cartridge N are opened by means of the transmission shown in FIG. 5.

Preparation for rewinding film is now complete. In this state, the film in the film cartridge M is slightly fed. The infrared LED sensors 17a check whether the film fed from the cartridge M is an undeveloped or developed one.

The film rewinder of this embodiment is used mainly to rewind developed film but can be used to rewind undeveloped one too. If the film being rewound is an undeveloped one, its exposed images will be marred if subjected to visible light. Thus, infrared light is used first to check whether the film is developed or not.

If the film turns out to be a developed one, the motor 31 is reactivated to feed the film again. The film is thus guided through the film guide 5. When its tip is inserted into the intermediate cartridge N and is caught by its spool by a certain length, the spool is turned by the other motor 39. The film is thus rewound around the spool of the intermediate cartridge N.

While the film is being wound around the spool of the intermediate cartridge N by the motor 39, the motor 31 for the film cartridge M is rotating in the same direction as the motor 39 to feed the film. But its revolving speed is slightly lower than that of the motor 39. Though not shown, the rotary shaft 34 of the film cartridge M carries a one-way clutch that allows freewheeling of the rotary shaft 34 while it is being driven by the motor 39 through the film due to the speed difference between the motors 39 and 31.

When the film is nearly completely fed out of the film cartridge M, an end mark or a small hole provided near the trailing end of the film is detected by the infrared sensors 17a and the film sensors 17b. Upon detection of the end mark, the sensors 17a, 17b produce detection signals to reverse the motor 31 for the film cartridge M.

As the motor 31 is reversed, the tool 20 is moved through the arcuate release guide 21 and the film guide 5. The position of the end mark, the film feed speed and the tool moving speed are preset so that the film trailing end will come to the spool end when the tip of the tool is inserted into the film cartridge M through its door and reaches the spool. The film trailing end is thus separated from the spool by the tool 20 in the manner illustrated in FIG. 7.

After the film trailing end has been separated from the spool of the film cartridge M, the film is wound still further and stopped with its trailing end in the film guide 5.

More detailed structure and operation of the film rewinder of this embodiment will be described with reference to FIGS. 8–14.

First, referring to FIGS. 3 and 8–10, description is made of the mechanism for transmitting the driving force of the motor 31, which is mainly used to rotate the spool of the film cartridge M, to the tool 20.

Figure 8:
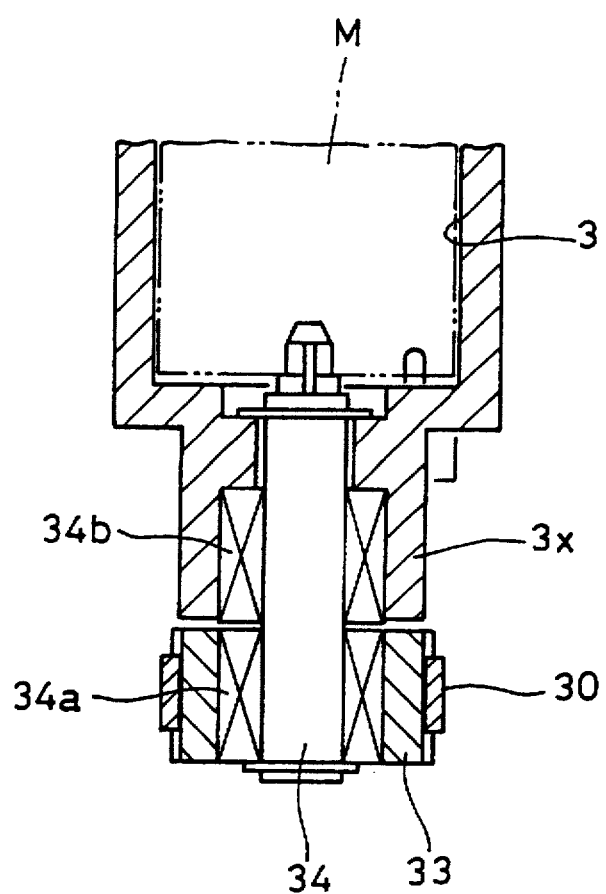
FIG. 8 is a sectional view of a rotation transmission mechanism provided under the film cartridge.

As mentioned earlier, film F is fed from the film cartridge M by rotating its spool (in the direction of arrow in FIG. 3) with the motor 31. As shown in FIG. 8, a one-way clutch 34a is mounted between the pulley 33 engaging the belt 30 and the rotary shaft 34.

Another one-way clutch 34b is mounted around the rotary shaft 34 over the one-way clutch 34a. The one-way clutch 34b has its outer ring fixed to a bottom portion 3x of the receptacle 3 to allow freewheeling of the rotary shaft 34 in the normal direction and check its rotation in the reverse direction. On the other hand, the one-way clutch 34a transmits only the rotation of the belt 30 in the normal direction to the rotary shaft 34 and disconnects the rotary shaft 34 from the belt while the latter is rotating in the reverse direction.

To feed film from the film cartridge M, the spool 101 is rotated in the normal direction by the motor 31 through the one-way clutches 34a and 34b. When the film is fed nearly completely out of the cartridge and the end mark is detected, the motor 31 is reversed.

The reverse rotation of the motor is transmitted through the belt 30 to the coaxial pulley 29 and then through the one-way clutch 29a to the rotary shaft 29b, rotating the rotary shaft 29b and thus the pinion gear 28 and the gear 27. The rotation of the gear 27 causes rotation of the eccentric pin 26. The arm 25 thus pushes the release arm 22, pivoting the release arm 22 counterclockwise about the pin 22p.

As the release arm 22 is pivoted counterclockwise, the arcuate tool 20 connected to the free end of the release arm 22 is moved along an arcuate path through the release guide 21 and the film guide 5 until its tip is inserted into the film cartridge M through its opening (not shown).

The film is thus separated from the spool of the film cartridge M by the tool 20 in the manner that has already been described above.

Figure 7A:
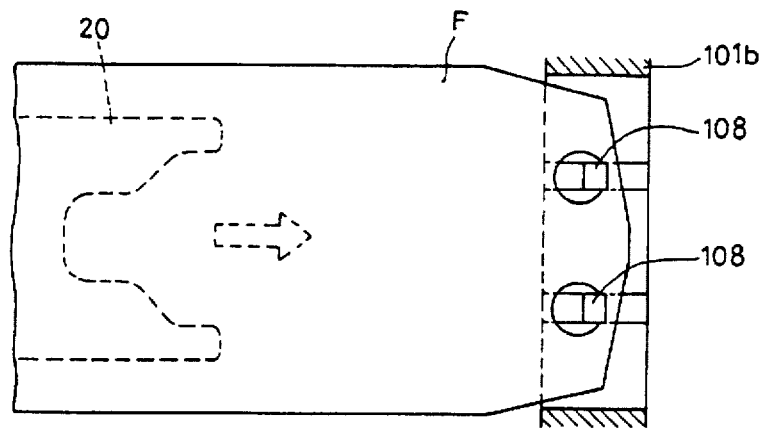
FIG. 7 is a view showing how the trailing end of a film is separated from the spool by the tool.
Figure 7B:
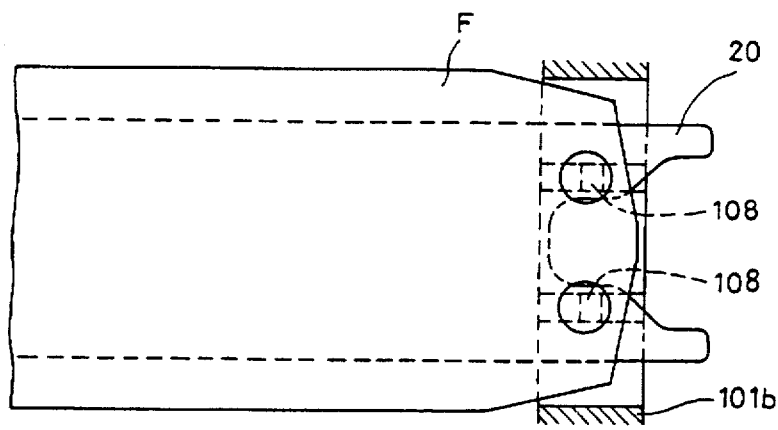
Figure 7C:
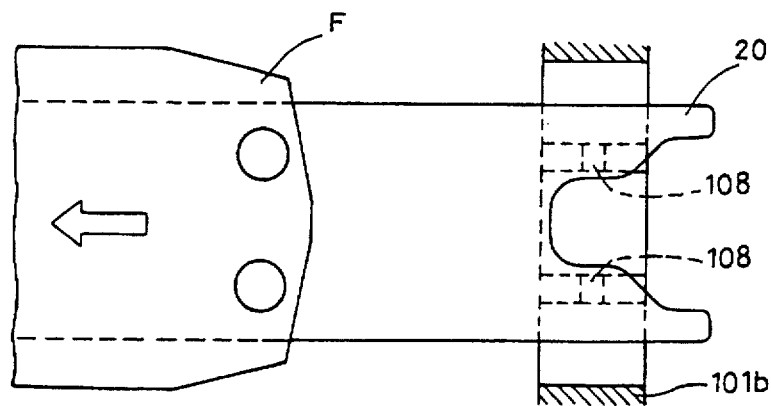

As the coaxial pulley 29 keeps rotating in the same direction after the film F has been separated from the spool by the tip of the tool 20, the arm 25 will now pull the release arm 22 in the direction of rotation of the coaxial pulley 29, so that the tool 20 is pulled back to its original position shown in FIG. 7. In short, the rotation of the gear 27 is converted to the pivoting motion of the tool 20 and the release arm 22 by the arm 25.

The one-way clutch 34b is provided to prevent damage to the film being fed out of the film cartridge M by positively preventing the rotary shaft 34 from rotating in the reverse direction even if the one-way clutch 34a fails to disengage soon enough when the rotating direction of the motor 31 is reversed and as a result the reverse rotation of the motor 31 is transmitted momentarily to the rotary shaft 34.

Next, description is made of a nail bending mechanism for bending a nail e (FIG. 12A) of the film cartridge M if it is not bent in spite of the fact that the film in the cartridge is a developed one. (Bent nail indicates that the film in the cartridge is a developed film.) This mechanism is driven by the motor 31 through the driving force transmission mechanism for the film separating tool 20.

As mentioned above, a film cartridge M that contains a developed film is formed with a hole d in its end plate 106. Thus, by visually checking the hole d, one can see that the cartridge contains a developed film. But in this embodiment, the infrared sensors 17a are used to check if the film is a developed one instead of visually checking the hole d.

Figure 11:
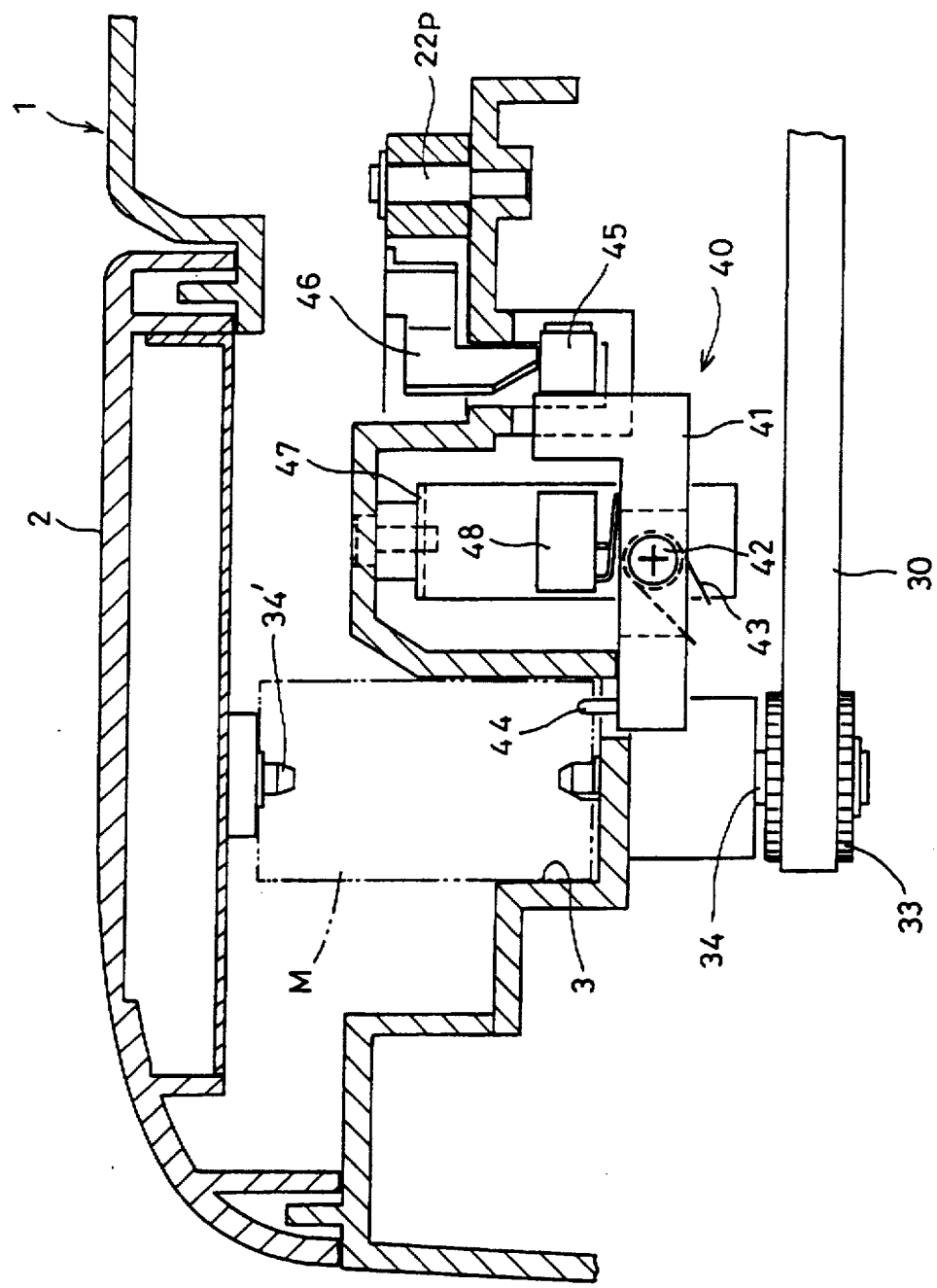
FIG. 11 is a partial sectional view of the film winding unit and the nail bending mechanism.
Figure 12A:
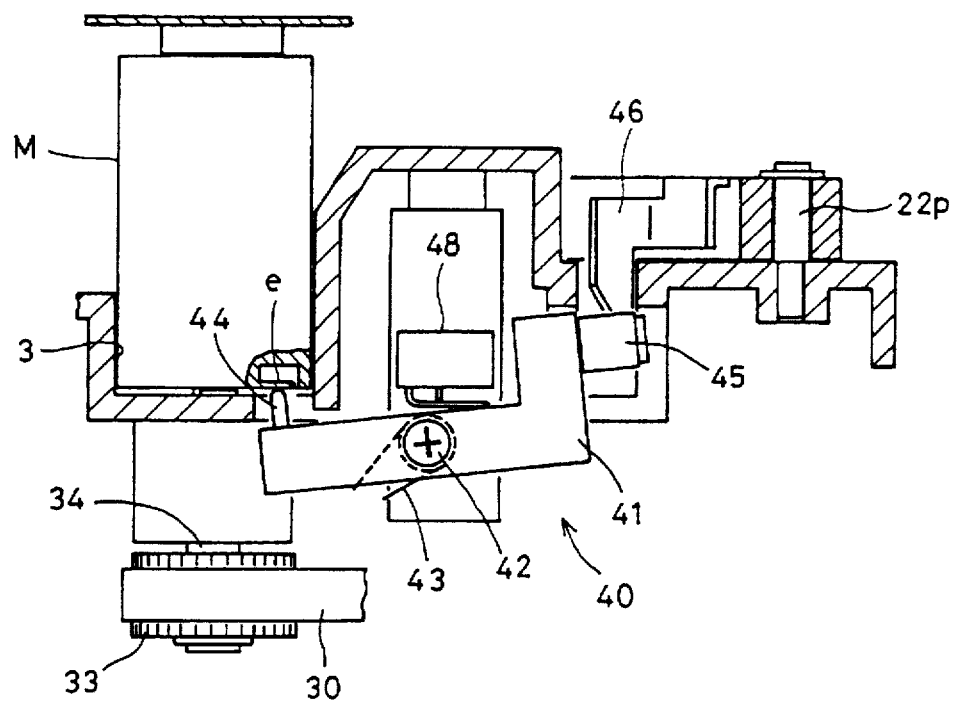
FIG. 12 is a view showing the operation of the same.
Figure 12B:
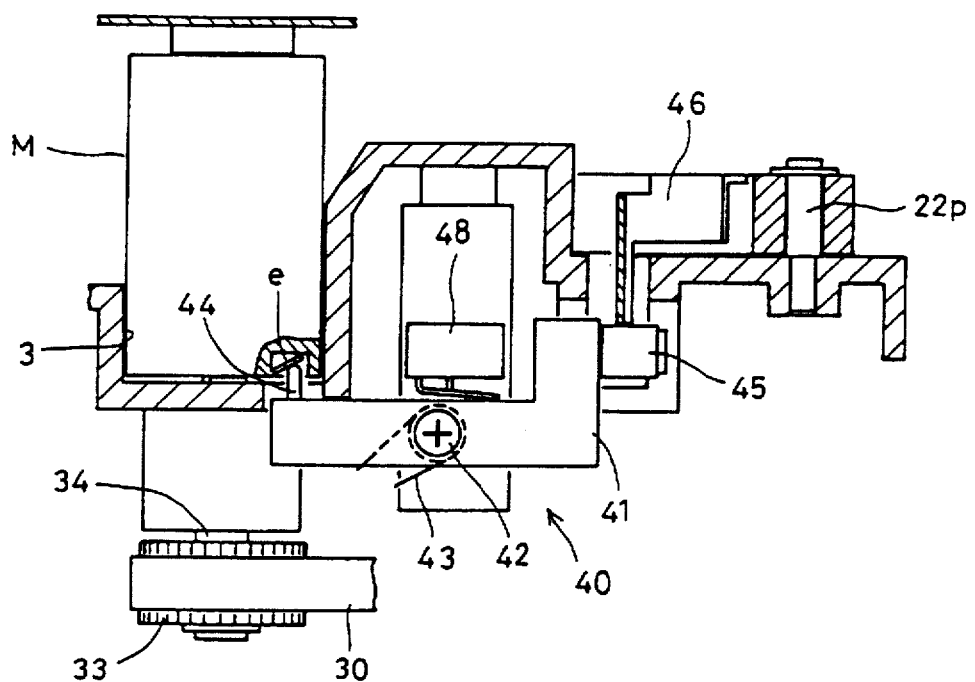

In the arrangement of this embodiment, if the nail e is not bent in spite of the fact that the film to be rewound from the film cartridge M to the intermediate cartridge N is a developed film, the nail bending mechanism shown in FIGS. 11 and 12 bends the nail mechanically, thus eliminating the possibility of malfunction in various later operation steps.

Figure 9:
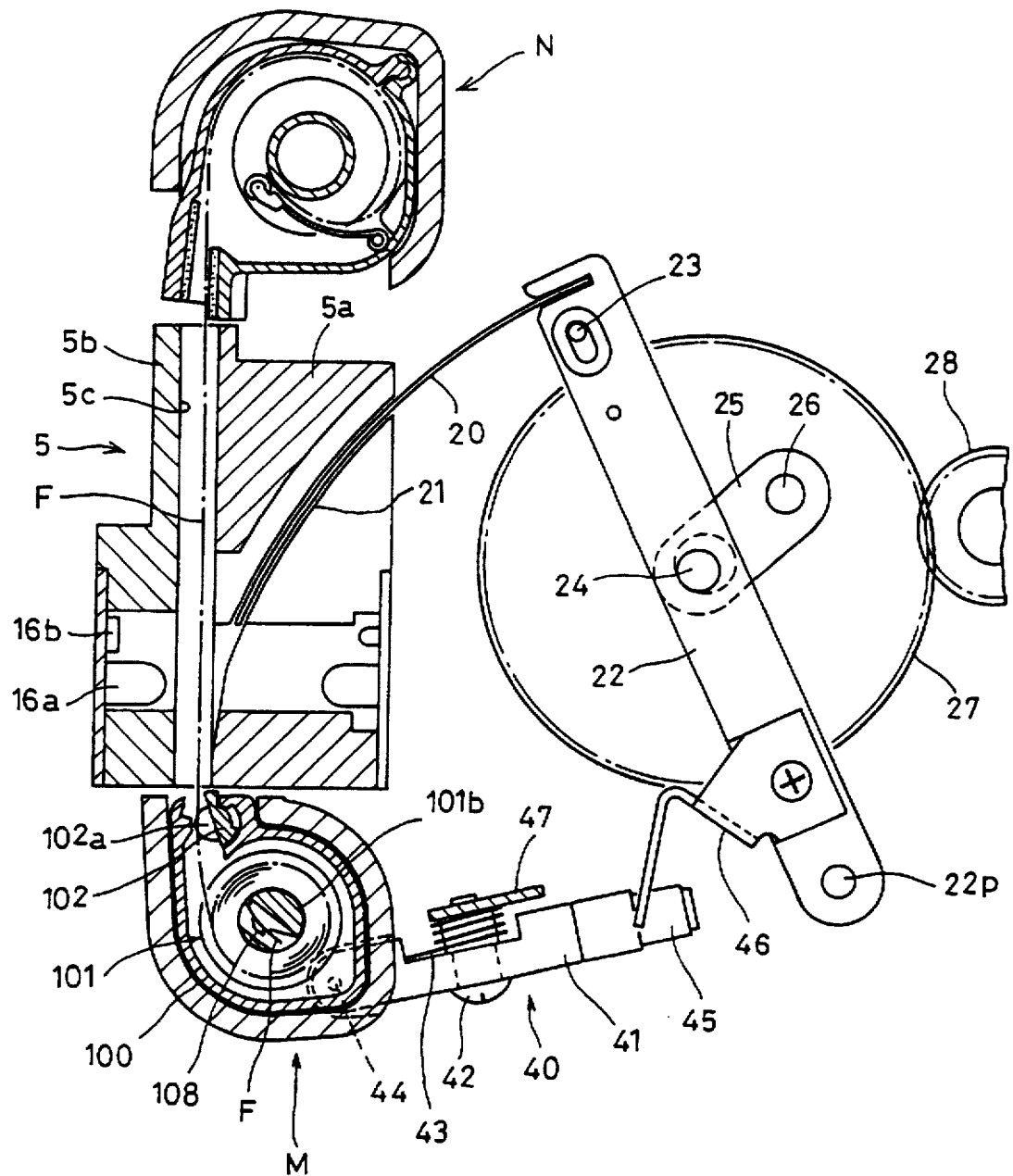
FIG. 9 is a partial enlarged plan view of the film guide, tool and cartridge.
Figure 10:
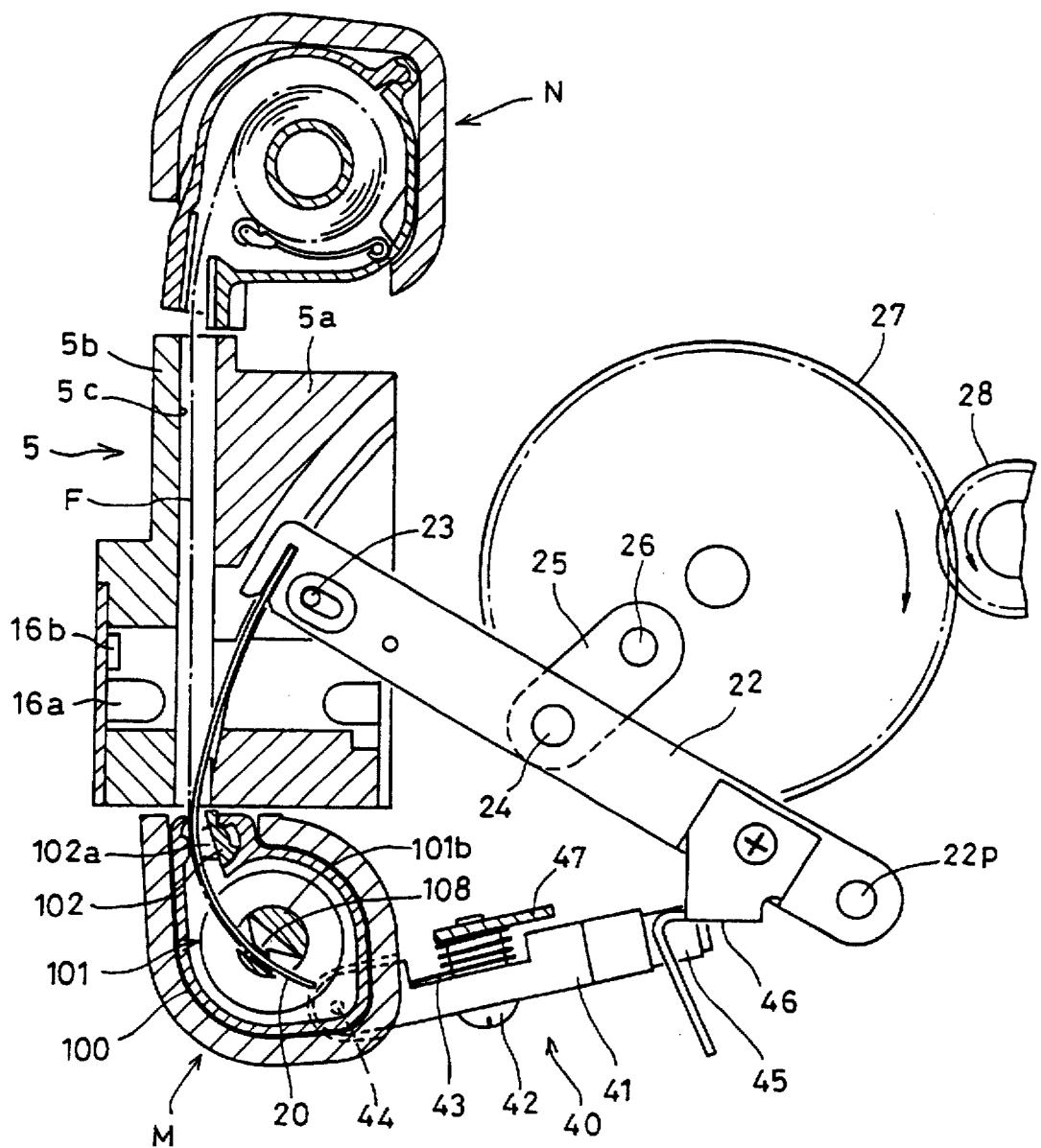
FIG. 10 is a view showing the operation of the same.

The nail bending mechanism is shown schematically in FIG. 3 by chain line, and in detail in FIGS. 9 and 10.

As shown, the nail bending mechanism 40 comprises a nail bending lever 41, a nail bending protrusion 44 provided at one end of the lever 41, a roller 45 provided at the other end of the lever 41, and a leaf spring 46 biasing the roller 45. The nail e of the film cartridge M is bent by leverage action by pivoting the nail bending lever 41 about a hinge 42 with the nail bending protrusion 44 abutting the nail e. Numeral 47 indicates a support member.

The nail bending lever 41 is always biased by a spring 43 to a horizontal state. When a film cartridge M having an unbent nail e is set in the receptacle 3, the nail bending lever 41 is pushed by the nail e into an inclined state as shown in FIG. 12A. In this state, the roller 45 at the other end of the nail bending lever 41 abuts the inclined end of the leaf spring 46, with the release arm 22 at the rest position shown in FIG. 9.

When the release arm 22 begins pivoting in this state, the roller 45 is pushed down by the inclined end of the leaf spring 46, and the nail bending lever 41 is pivoted to the horizontal state, so that the nail e of the film cartridge M is pushed and bent.

If the nail e has already been bent when the film cartridge M is set in the film rewinder, the protrusion 44 will be inserted in a recess formed in the cartridge by bending the nail, so that the nail bending lever 41 will not incline, i.e. be kept horizontal by the spring 43.

When the nail bending lever 41 is moved together with the release arm 22 to bend the nail, its movement is detected by the sensor 48.

Figure 13A:
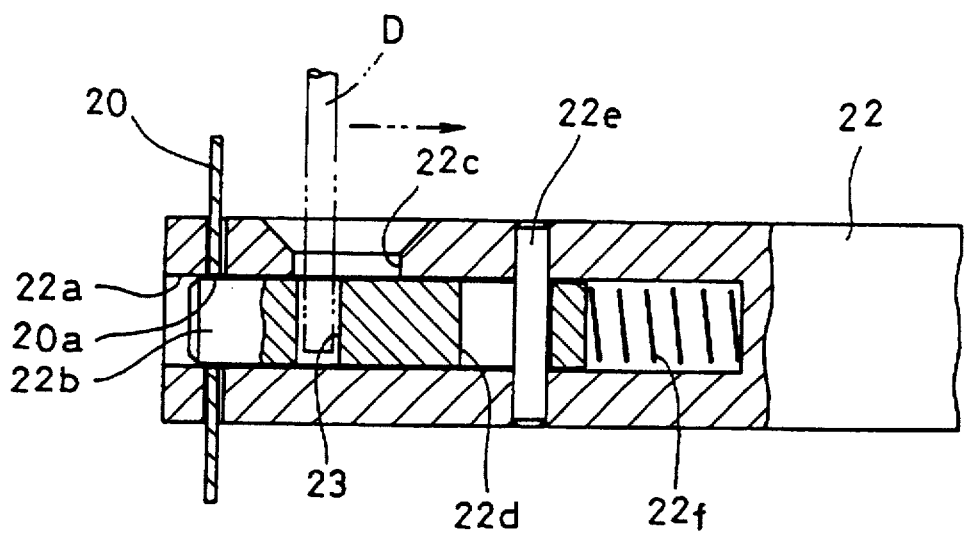
FIG. 13 is a detailed sectional view of the tool and the release arm.
Figure 13B:
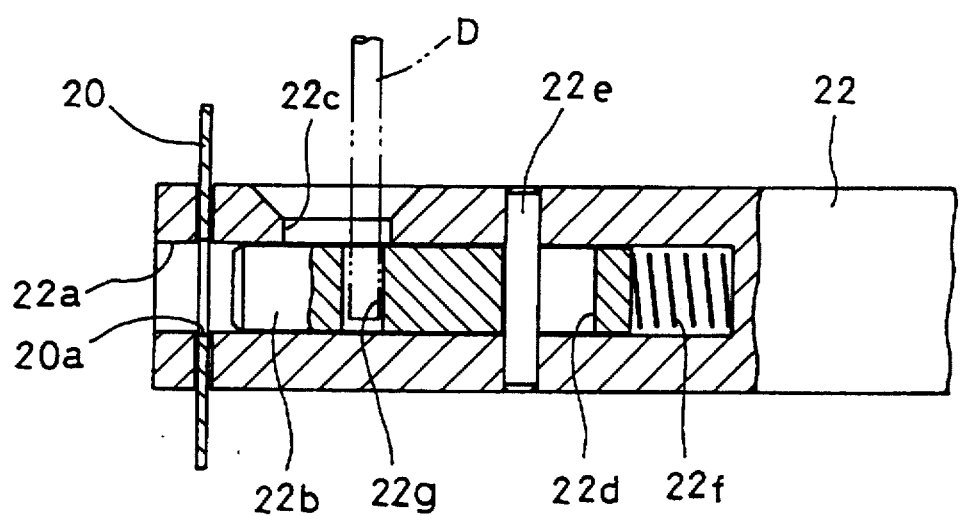
Figure 14:
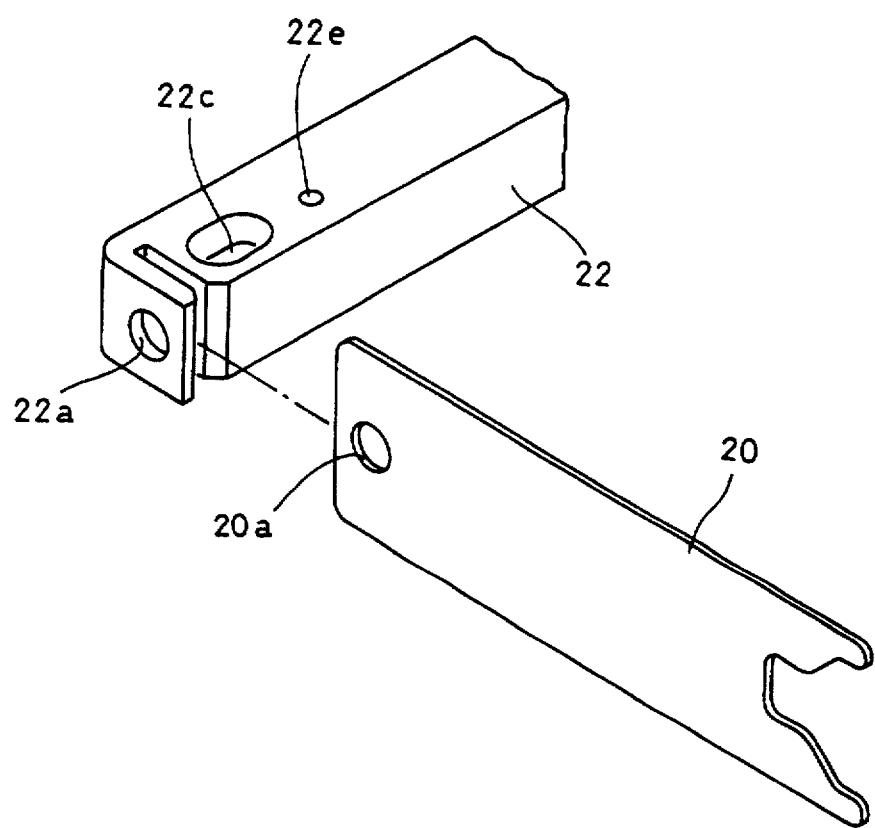
FIG. 14 is a view of the same showing the state in which the tool and the release arm are separate from each other.

FIGS. 13 and 14 show the detailed structure of a means for mounting the tool 20 to the release arm 22. This mounting means makes it easy to detach the tool 20 for replacement when it is worn or damaged.

The release arm 22 has an elongated hole 22a formed in the leading end thereof. A spring 22f and a rod 22b are inserted in the elongated hole 22a with the spring 22f being deeper in the hole 22a. The rod 22b is formed with a small hole 22g in which is inserted a thin rod D such as a screwdriver through an elongated hole 22c formed in the release arm 22, and with a small hole 22d which receives a pin 22e extending through the release arm 22. The tool 20 has a hole 20a at its free end.

In order to connect the tool 20 to the release arm 22, the tool 20 is inserted into a slot formed in the release arm 22 with the rod 22b retracted to the position shown in FIG. 13B by inserting the rod D in the small hole 22g and moving it in the direction of arrow in FIG. 13A.

By moving the rod D back to the position of FIG. 13A in this state, the rod 22b is inserted into the hole 20a in the tool 20. The tool is thus connected to the release arm 22. The tool 20 can be disconnected from the release arm by carrying out the abovementioned steps in the reverse order.

FIGS. 15–19 show the second embodiment. The film rewinder of this embodiment has a film guide means, a power transmission means for the knob plate, a means for setting a film cartridge M and an intermediate cartridge N in upright position, a support means for stably supporting the intermediate cartridge N, and a locking means for locking the cover plate with the knob plate.

These means are all operatively linked to the movement of the knob plate or the cover plate so that preparations before starting film rewinding after the setting of the cartridges M and N can be carried out extremely easily or automatically, while minimizing the size of the entire film rewinder.

Figure 15A:
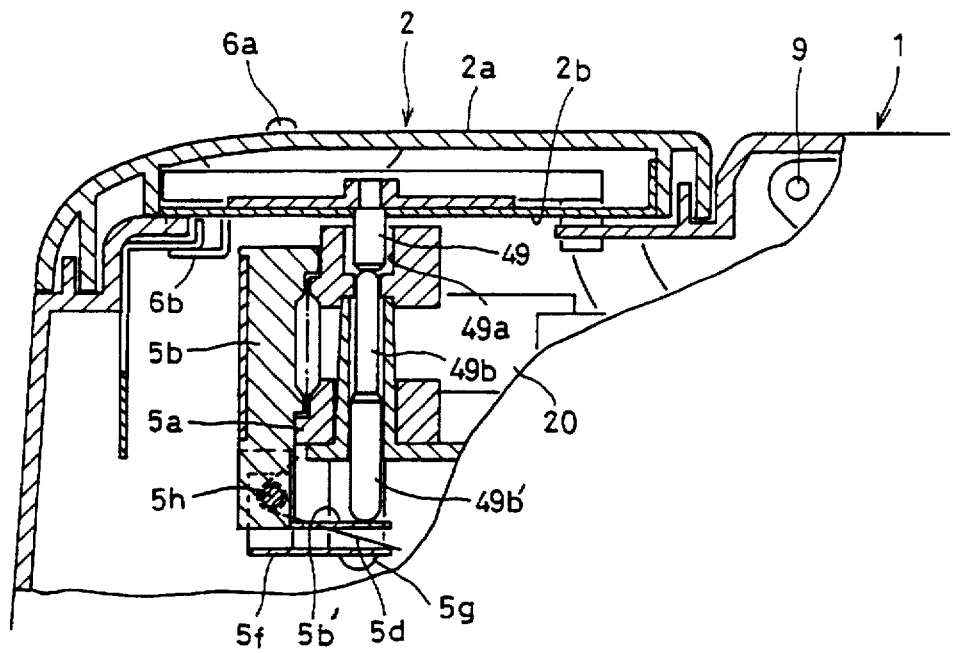
FIG. 15A is a partial sectional view of the film guide.
Figure 15B:
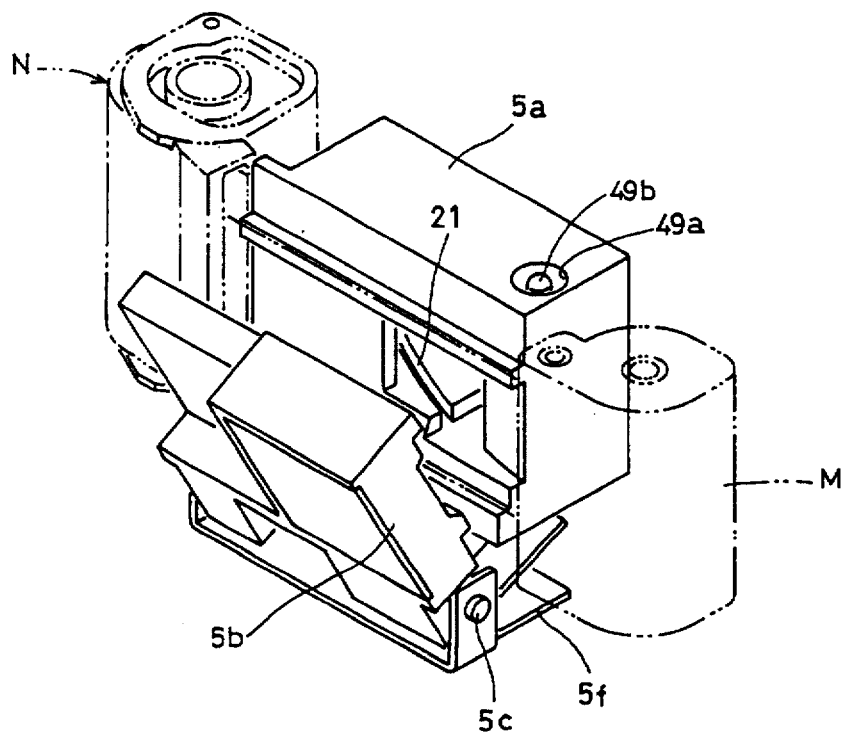
FIG. 15B is its partial perspective view.
Figure 16:
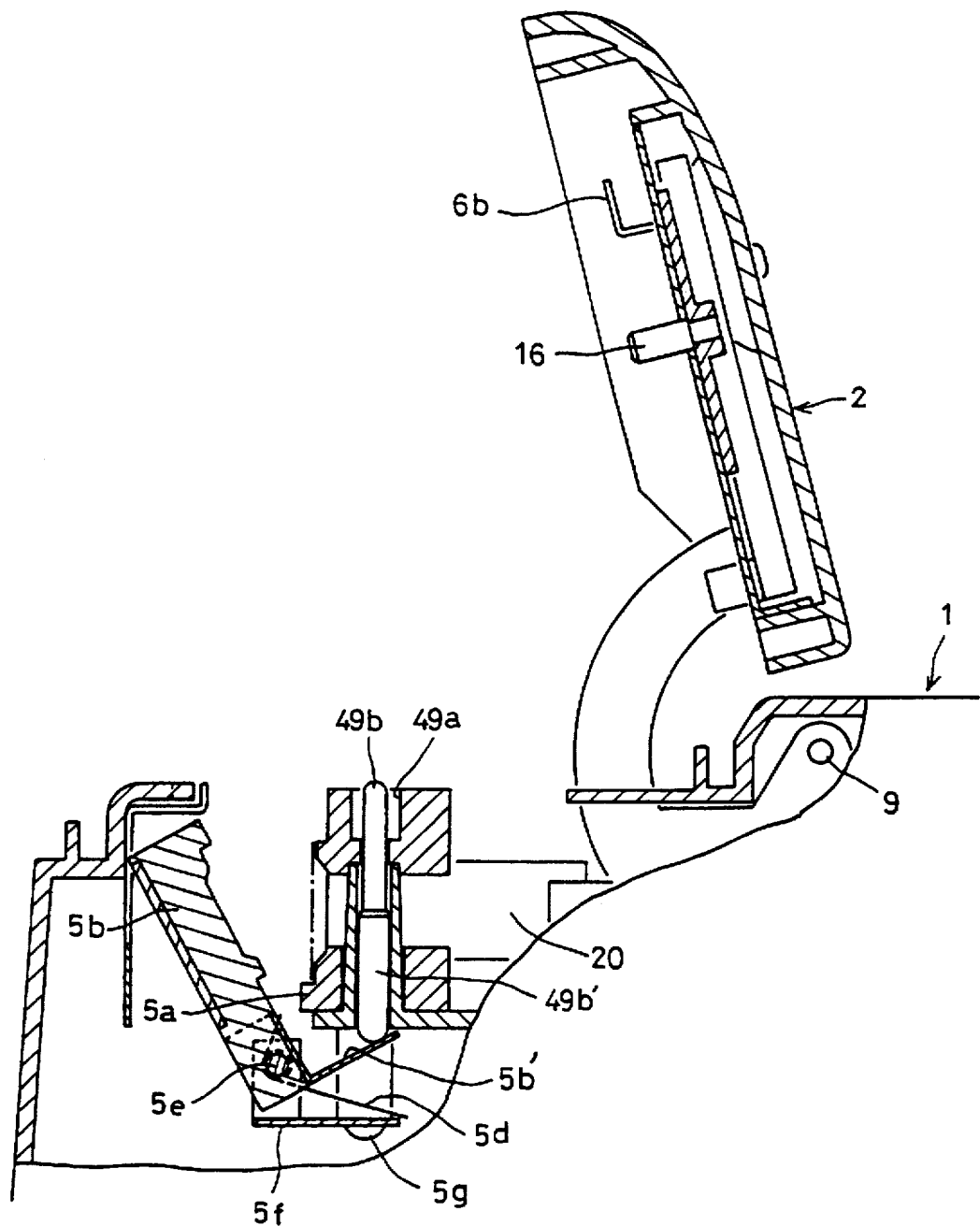
FIG. 16 is a partial sectional view of the same with the cover plate opened.

More detailed structure and function of this embodiment are now described. FIGS. 15 and 16 show the detailed structure of a means for opening and closing a turn guide member 5b of the film guide 5 by opening and closing the cover plate 2. FIG. 15A is a section of the front portion of the film guide with the cover 2 plate closed. FIG. 15B is a perspective view of the same portion with the cover plate 2 opened.

As seen in FIG. 15B, by opening the cover plate 2, the turn guide 5b is pivoted about a support space 5h, biased by a leaf spring 5d, to its open position. When the cover plate 2 is closed, a protrusion 49 provided on the backside of the cover plate 2 pushes down a pushrod 16b vertically slidably received in a hole 49a formed in a fixed guide member 5a of the film guide 5.

As shown in FIG. 15A, the pushrod 16b has its bottom end 16b' in abutment with a support plate 5b' extending laterally from the turn guide member 5b. The turn guide member 5b is thus pivoted by the pushrod 16b. The support space 5h is rotatably supported on vertical lobes of a support plate 5f fixed to legs extending downward from the fixed guide member 5a by screws 5g.

FIG. 16 is a sectional view showing the turn guide member 5b opened by opening the cover plate 2.

By closing the cover plate 2, the protrusion 49 pushes down the pushrod 16b, pivoting the turn guide member 5b until it faces the fixed guide member 5a as shown in FIG. 15A. In this state, it is possible to feed film while guiding it with the turn guide member 5b.

Figure 17:
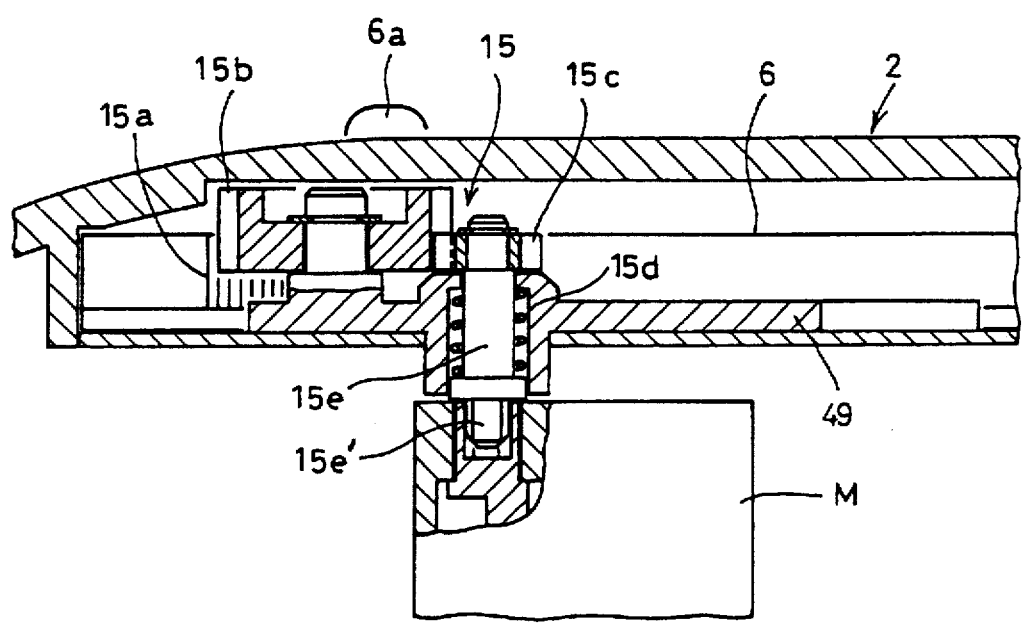
FIG. 17 is a partial sectional view taken along XVII—XVII of FIG. 2.

FIG. 17 shows a sectional view of the aforementioned gear train 15. It converts the movement of the knob plate 6 to a pivoting motion of the door of the film cartridge M between its open and closed positions. As described earlier, the gear train 15 comprises the rack 15a, pinion 15b and small gear 15c. The small gear 15c is coaxially provided on a light lock shaft 15e around which is mounted a compression coil spring 15d.

As the cover plate 2 is closed, the tip 15e' of the light lock shaft 15e is inserted in a small hole formed in the end face of the shaft for opening and closing the door of the film cartridge M. By moving the knob plate 6 in this state, the door can be opened as described earlier. With repeated use of the film rewinder for prolonged period, this small hole may be clogged with foreign objects or its corner may be worn and develop scratches.

If the cover plate 2 is forcibly opened and closed in this state, the light lock shaft 15e may be bent or the pinion 15b may be damaged. The compression coil spring 15d is provided to prevent such trouble. If the cover plate 2 is closed with the small hole formed in the end face of the door-opening shaft clogged with foreign matter, the light lock shaft 15e is inserted only slightly into the small hole. In such a case, the light lock shaft 15e can rise, while compressing the compression coil spring 15d. It is thus possible to prevent the pinion 15c from getting stuck and damaged or otherwise protect the gear train 15.

Next, description is made of the means for setting the two cartridges in upright position, and the support means for stably supporting the intermediate cartridge N.

Figure 18:
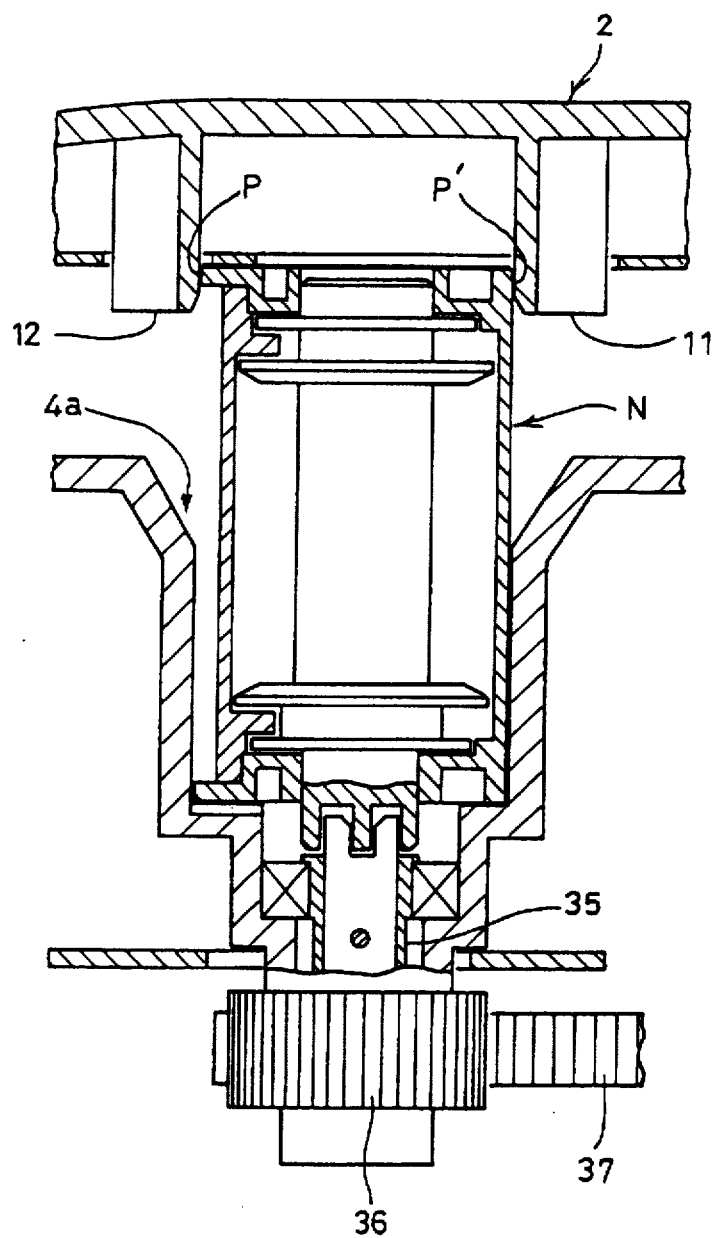
FIG. 18 is a partial sectional view taken along line XVIII—XVIII of FIG. 2.

FIG. 18 is a partial sectional view of the receptacle 4a for receiving the intermediate cartridge N. As clearly shown in this figure and FIG. 1, both the intermediate cartridge N and the film cartridge M are set in the respective receptacles in upright position, i.e. parallel to the thickness direction of the case of the film rewinder.

This is because the cartridges M and N can be set more easily in upright positions than in horizontal positions. Also, with this arrangement, it is possible to simplify the inner structure of the film rewinder and thus to reduce its size.

Figure 19A:
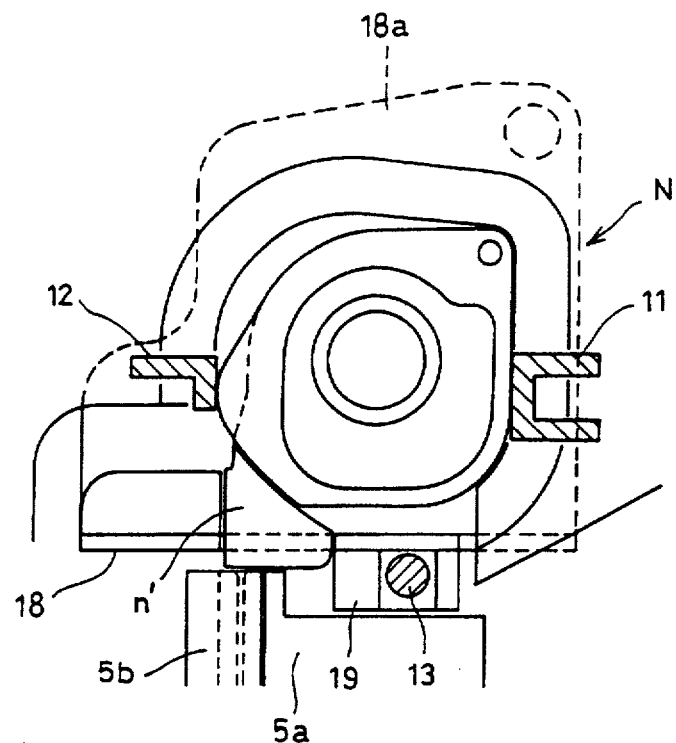
FIG. 19 is a partial plan view of the intermediate cartridge.
Figure 19B:
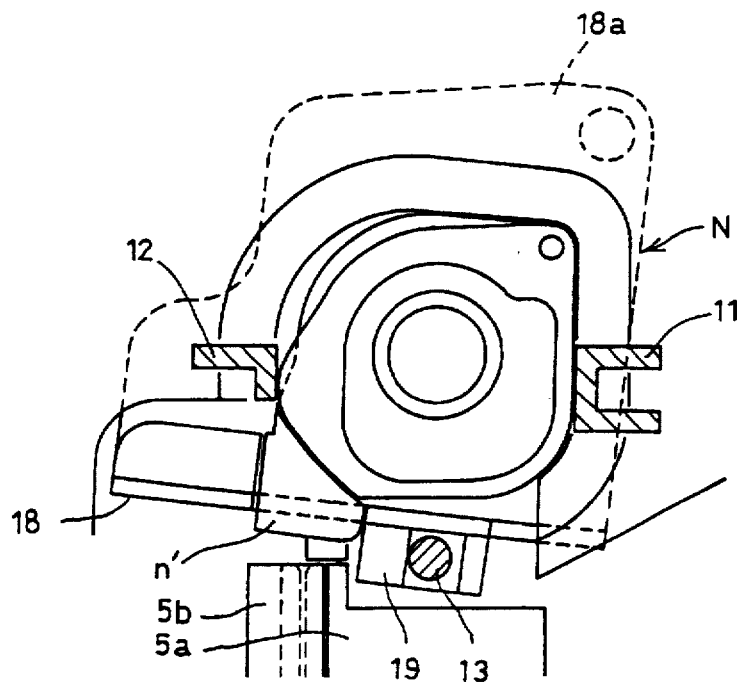

As shown in FIGS. 18 and 19, by closing the cover plate 2, the intermediate cartridge N is held stably in position, sandwiched between the engaging pieces 11 and 12 at its top ends at points p and p'. With the bottom end of the intermediate cartridge N inserted in the receptacle 4a, the cartridge's spool shaft is brought into engagement with the rotary shaft 35. The cartridge door is opened and closed in the above-described manner.

Figure 20:
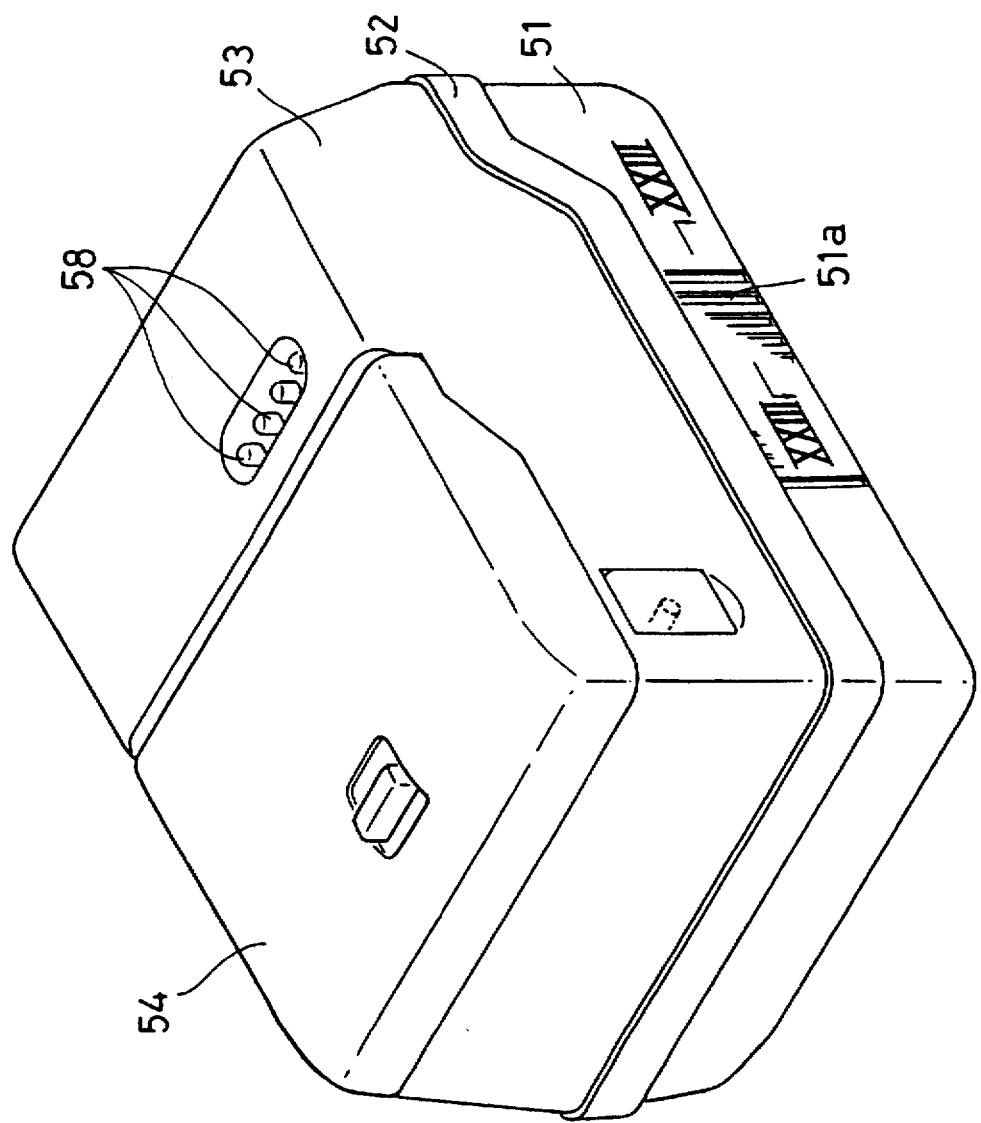
FIG. 20 is a perspective view of the case of the film rewinder embodying this invention.
Figure 21:
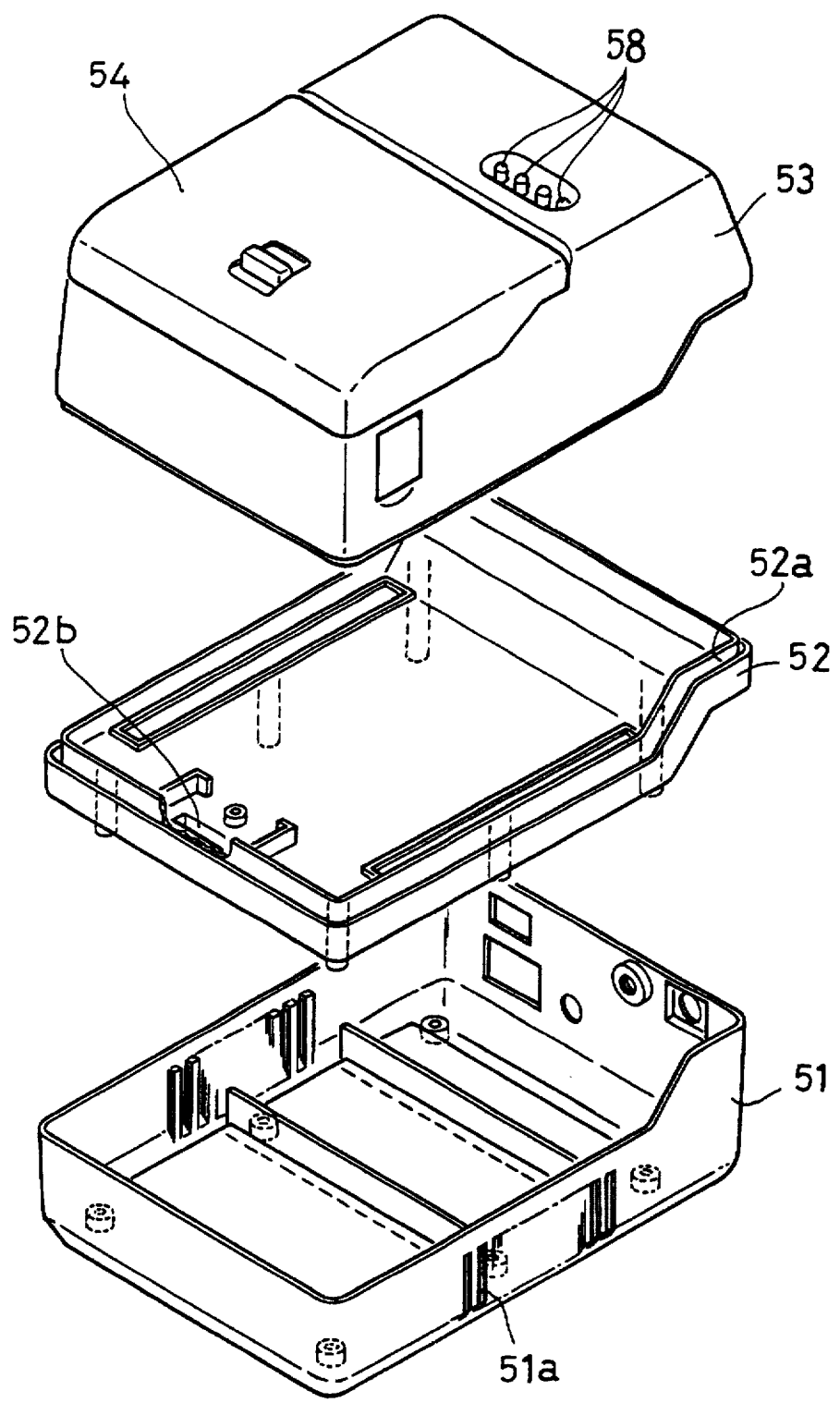
FIG. 21 is an explosive perspective view of the case of FIG. 20.
Figure 22:
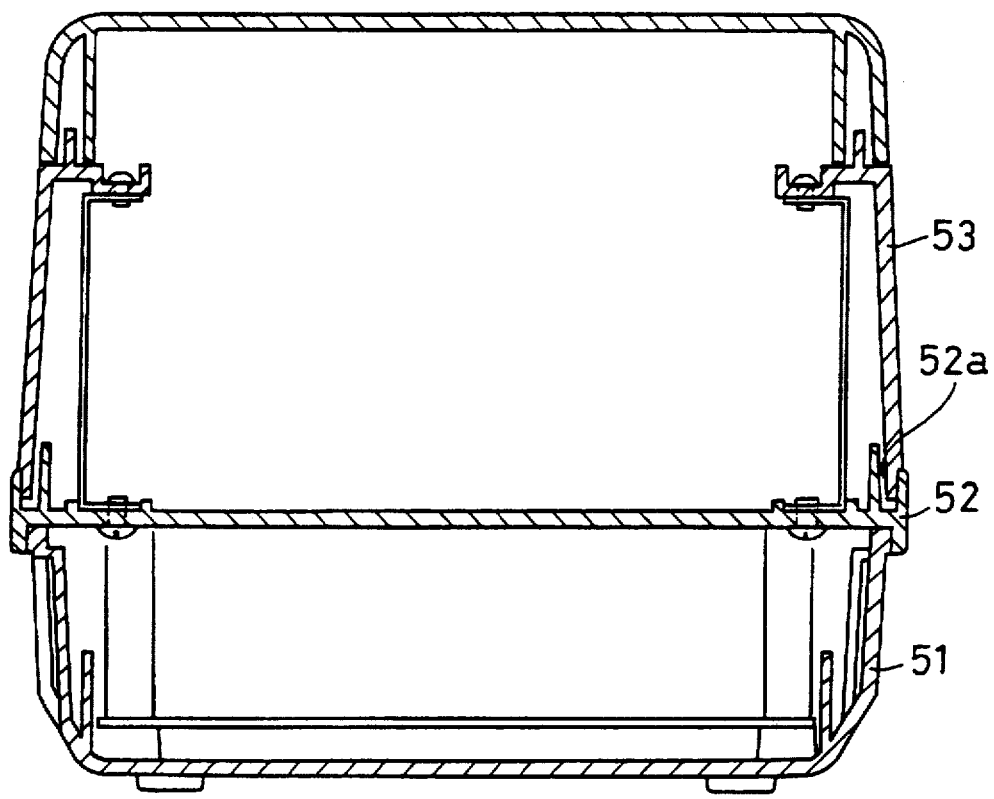
FIG. 22 is a sectional view of the case of FIG. 20.

FIGS. 20–24 show the detailed structure of the case of the film rewinder according to the present invention. As shown in FIGS. 20–22, the case comprises a first case member 51, a partitioning wall 52 and a second case member 53 that are stacked one on another. The first case member 51 has a top opening in which is fitted the partitioning wall 52. The second case member 53 has a bottom opening. The partitioning wall 52 has a groove 52a formed along the peripheral edge thereof. The bottom edge of the second case member 53 is fitted in the groove 52a to prevent the passage of light between the second case member 53 and the partitioning wall 52.

Figure 23:
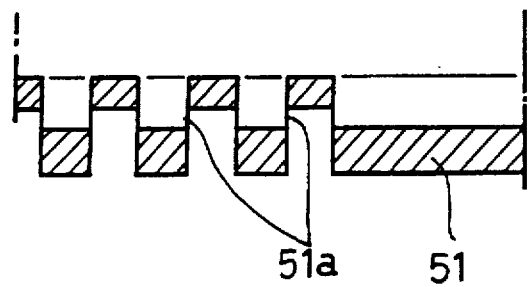
FIG. 23 is partial sectional view taken along line XXIII—XXIII of FIG. 20.

The first case member 51 has a plurality of vent slits 51a in its side walls. FIG. 23 shows the detailed structure of the vent slits 51a.

Figure 24:
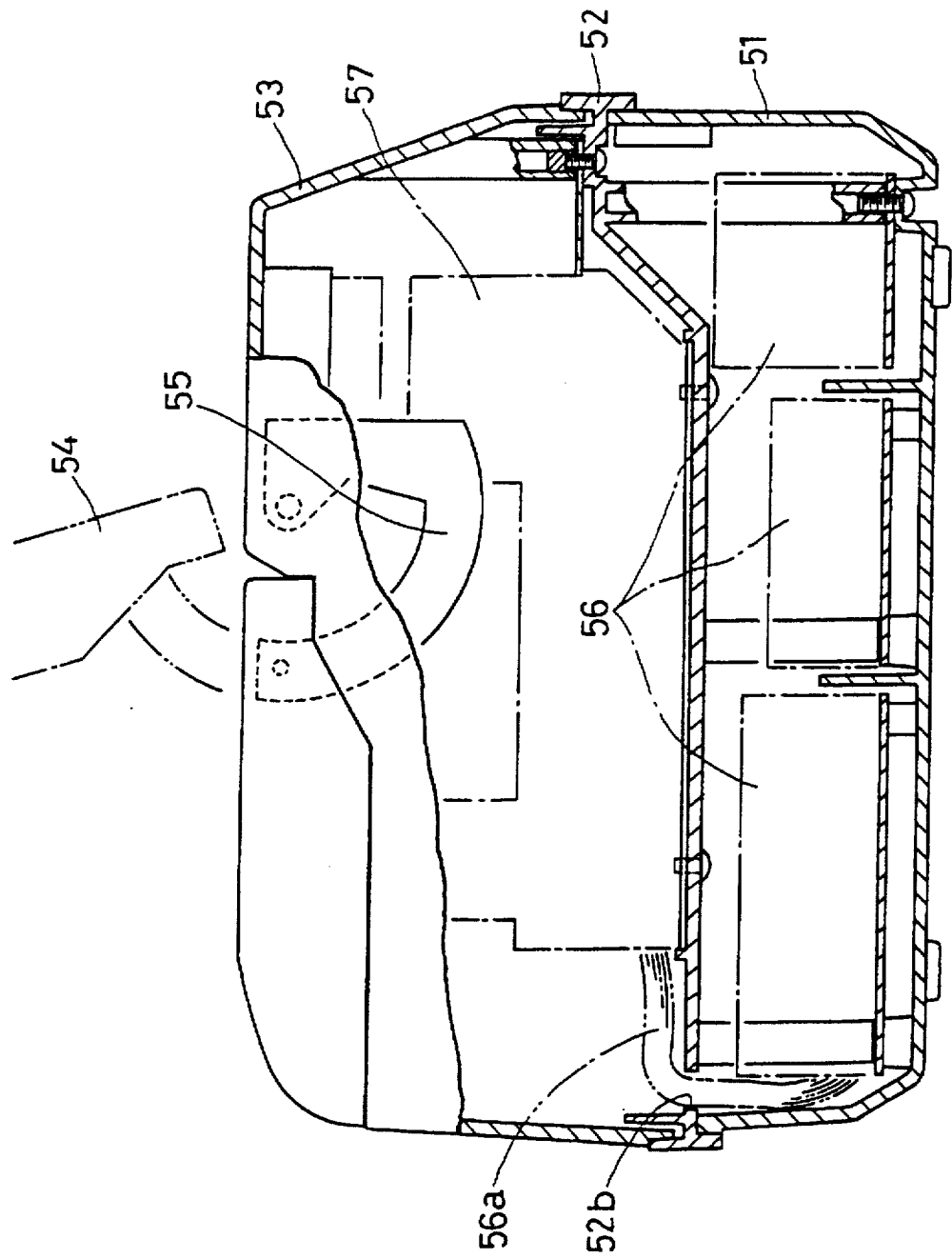
FIG. 24 is a sectional view of the case shown in FIG. 20.
Figure 26A:
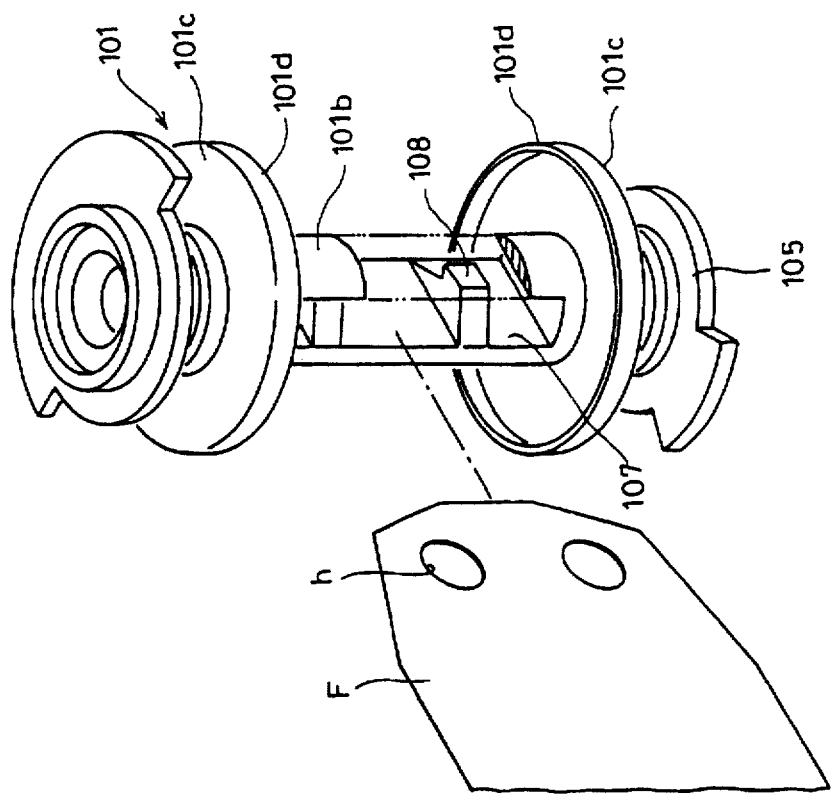
FIG. 26A is its vertical sectional view.
Figure 26B:
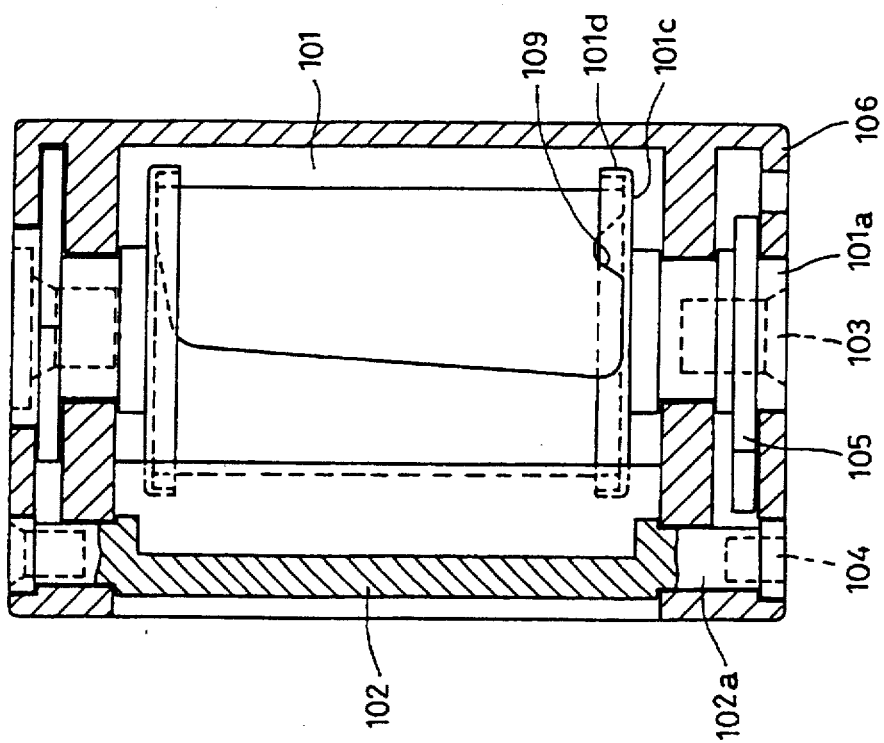
FIG. 26B is view showing the inner structure of the same.

The second case member 53 has a cover 54. As shown in FIGS. 23 and 24, the cover 54 is pivotally supported by arms 55 having one end thereof fixed to the cover 54 and the other end pivotally connected to the second case member 53 so as to be movable in a circular path.

The cover 54 has a groove 54a formed along its peripheral edge. The second case member 53 has an opening 53a. A rib 53b is formed along the edge of the opening 53a. When the opening 53a is closed by the cover 54, the rib 53b of the second case member 53 fits in the groove 54a of the cover 54, preventing the passage of light between the cover 54 and the second case member 53.

The first case member 51 houses an electric control units 56. The second case member 53 houses a winding unit 57. The electric control units 56, including a power source, an operation circuit, etc., controls the winding unit 57 and turns on and off indicator lamps 58 provided on the second case member 53. Numerous cords 56a extend from the electric control units 56, passing through a hole 52b formed in the partitioning wall 52, into the second case member 53.

As seen in FIGS. 20 and 22, the winding unit 57 has a frame 59 having a first receptacle 61 and a second receptacle 62. A film cartridge M and an intermediate cartridge N are set in the respective receptacles 61 and 62 after opening the cover 54. The cover 54 is then closed.

By closing the cover 54, a cover for the film inlet/outlet of the film cartridge M and a cover for the film inlet/outlet of the intermediate cartridge N are opened, so that the film in the film cartridge M can be fed into the intermediate cartridge N.

The partitioning wall 52 prevents the conduction of heat produced from the electric control units 56 in the first case member 51 to the second case member 53, thus protecting the winding unit 57 in the second case member 53 against heat.

Also, the partitioning wall 52 makes it possible to keep the interior of the second case member 53 blacked out so that the winding unit 57 can perform its function, while ventilating the interior of the first case member 51 to cool the electric control units 56 by forming the vent slits 51a.

The winding unit 57 and the electric control units 56 can be accessed easily for repair and maintenance simply by lifting and detaching the second case member 53 and the partitioning wall 52, respectively.

This invention is not limited to the above-described specific embodiment. For example, the entire case or the case members 51 and 53 may have different shapes from those shown. Also, this invention is applicable to either a film winder for rewinding exposed or undeveloped film from a film cartridge to an intermediate cartridge or a film winder for rewinding developed film from a film cartridge to an intermediate cartridge.

The film rewinder according to this invention comprises a case having an openable cover plate, a receptacle for receiving a film cartridge and a film winding unit for winding film into an intermediate cartridge, the film cartridge receptacle and the film winding unit being provided opposite to and spaced from each other in the case, a film guide for guiding film being fed from the film cartridge to the film winding unit, driving units for rotating spools of the film cartridge and the intermediate cartridge independently of each other, and a tool for separating the film from the spool of the film cartridge. The tool is pivoted by the driving unit for the film cartridge. The film guide is provided with a tool guide to minimize the length of the film guide. It is thus possible to minimize the distance between the two cartridges. This in turn makes it possible to streamline the tool driving mechanism and thus to provide a compact, easy-to-operate film rewinder.

What is claimed is:

1. A film rewinder for rewinding from a film cartridge to an intermediate cartridge, said film cartridge and said intermediate cartridge each having a spool, said film rewinder comprising a case having an openable cover plate, a receptacle for receiving the film cartridge and a film winding unit for winding film into the intermediate cartridge, said film cartridge receptacle and said film winding unit being provided opposite to and spaced from each other in said case, a film guide for guiding film being fed from said film cartridge to said film winding unit, driving units for rotating the spools of said film cartridge and said intermediate cartridge independently of each other, an arcuate tool for separating the trailing end of film from the spool of said film cartridge after the film has been wound into said intermediate cartridge, an arm for pivoting and inserting said tool into said film cartridge by rotating in the direction opposite to the direction in which the spool of said film cartridge is rotated, and a rotation transmission means for transmitting the rotation of the driving unit for rotating the spool of said film cartridge to said arm to pivot said arm, said film guide having an arcuate tool guide for guiding said tool, the length of said film guide including said tool guide being set to a minimum value so that the distance between said film cartridge receptacle and said film winding unit will be minimum.

2. A film rewinder as claimed in claim 1 wherein a rotary shaft for rotating said spool of said film cartridge is provided with a one-way rotation transmission means that transmits driving force from the driving unit for driving the film cartridge spool to the film cartridge spool only while said driving unit for driving the film cartridge spool is rotating in a direction to feed film out of said film cartridge, and wherein said rotation transmission means does not transmit driving force from said driving unit for driving the film cartridge spool not to the film cartridge spool but to said arm while said driving unit for driving the film cartridge is rotating in a direction opposite to the direction to feed film out of said film cartridge.

3. A film rewinder as claimed in claim 2 further comprising a nail bending means for bending a nail while said tool pivots.

4. A film rewinder as claimed in claim 2 wherein said tool is detachably coupled to the free end of said arm by an engaging piece, the position of which is adjustable by a resilient member.

5. A film rewinder as claimed in claim 1 further comprising a nail bending means for bending a nail while said tool pivots.

6. A film rewinder as claimed in claim 5 wherein said tool is detachably coupled to the free end of said arm by an engaging piece, the position of which is adjustable by a resilient member.

7. A film rewinder as claimed in claim 1 wherein said tool is detachably coupled to the free end of said arm by an engaging piece, the position of which is adjustable by a resilient member.

8. A film rewinder for rewinding from a film cartridge to an intermediate cartridge, said film cartridge and said intermediate cartridge each having a spool, said film rewinder comprising a case having an openable cover plate, a receptacle for receiving the film cartridge and a film winding unit for winding film into the intermediate cartridge, said film cartridge receptacle and said film winding unit being provided opposite to and spaced from each other in said case, a film guide for guiding film being fed from said film cartridge to said film winding unit, driving units for rotating the spools of said film cartridge and said intermediate cartridge, a tool for separating a film trailing end from the spool of said film cartridge when the film is wound into said intermediate cartridge, said cover plate carrying a slidable knob plate having a knob, said film guide comprising two members, at least one of said two members being opened when one of said cover plate and said knob plate is moved, and means for transmitting the movement of said one of said cover plate and said knob plate to doors of both of said film cartridge and said intermediate cartridge to open and close said doors, wherein initial settings for both of said cartridges are operatively linked together.

9. A film rewinder as claimed in claim 8 further comprising a film guide opening member provided on the back side of said cover plate for opening and closing said film guide by pivoting one of said two members of said film guide.

10. A film rewinder as claimed in claim 9 further comprising a gear train in mesh with teeth formed on one side of said knob plate, and having an output shaft adapted to be engaged in a door-opening shaft of said film cartridge with said cover plate closed to open and close the door of said film cartridge.

11. A film rewinder as claimed in claim 9 wherein said film cartridge receptacle and said film winding unit have recesses extending in the direction of thickness of said case, and wherein said cover plate is provided with a protrusion adapted to abut a shoulder portion of said intermediate cartridge when said cover plate is closed to stably hold said intermediate cartridge in position.

12. A film rewinder as claimed in claim 8 further comprising a gear train in mesh with teeth formed on one side of said knob plate, and having an output shaft adapted to be engaged in a door-opening shaft of said film cartridge with said cover plate closed to open and close the door of said film cartridge.

13. A film rewinder as claimed in claim 8 wherein said film cartridge receptacle and said film winding unit have recesses extending in the direction of thickness of said case, and wherein said cover plate is provided with a protrusion adapted to abut a shoulder portion of said intermediate cartridge when said cover plate is closed to stably hold said intermediate cartridge in position.

* * * * *